US008270186B2

(12) United States Patent
Sakakibara

(10) Patent No.: US 8,270,186 B2
(45) Date of Patent: Sep. 18, 2012

(54) POWER CONVERSION DEVICE

(75) Inventor: Kenichi Sakakibara, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 341 days.

(21) Appl. No.: 12/739,688

(22) PCT Filed: Oct. 21, 2008

(86) PCT No.: PCT/JP2008/069048

§ 371 (c)(1), (2), (4) Date: Apr. 23, 2010

(87) PCT Pub. No.: WO2009/054379

PCT Pub. Date: Apr. 30, 2009

(65) Prior Publication Data

US 2010/0244570 A1 Sep. 30, 2010

(30) Foreign Application Priority Data

Oct. 24, 2007 (JP) ................................ 2007-276785

(51) Int. Cl.
*H02M 5/451* (2006.01)
*H02M 7/5395* (2006.01)

(52) U.S. Cl. ............................ 363/37; 363/97; 363/131

(58) Field of Classification Search .................... 363/34, 363/37, 56.04, 97, 131
See application file for complete search history.

(56) References Cited

U.S. PATENT DOCUMENTS 7,102,322 B2 * 9/2006 Suzuki ......................... 318/801

(Continued)

FOREIGN PATENT DOCUMENTS

JP 3-107373 A 5/1991

(Continued)

OTHER PUBLICATIONS

Jong-Lick Lin, "A new approach of dead-time compensation for PWM voltage inverters ," Circuits and Systems I: Fundamental Theory and Applications, IEEE Transactions on, vol. 49, No. 4, pp. 476-483, Apr. 2002. doi: 10.1109/81.995662 URL: http://ieeexplore.ieee.org/stamp/stamp.jsp?tp=&arnumber=995662 &isnumber=21476.*

(Continued)

*Primary Examiner* — Adolf Berhane
*Assistant Examiner* — Fred E Finch, III
(74) *Attorney, Agent, or Firm* — Birch, Stewart, Kolasch & Birch, LLP

(57) ABSTRACT

A switch device is brought into conduction in a case where a carrier takes a value zero to drt, a switch device is brought into conduction in a case where the carrier takes a value the drt to one, and one cycle of the carrier is divided into a period in which the carrier has a command value or more and a period in which the carrier has the command value or less. The periods are calculated by dst·T and drt·T, respectively. The same one as the carrier of a converter is employed in a carrier of an inverter, and based on the value drt set as a reference value, a command value of the inverter is provided in each of a side with a value larger than the reference value and a side with a value smaller than the reference value. The period in which the carrier takes the value or more is divided at a ratio among d0, d4 and d6, and the period in which the carrier takes the value drt or less is divided at the ratio among d0, d4 and d6.

4 Claims, 13 Drawing Sheets

U.S. PATENT DOCUMENTS

| | | | | |
|---|---|---|---|---|
| 7,400,518 | B2 * | 7/2008 | Yin et al. | 363/41 |
| 2001/0002784 | A1 * | 6/2001 | Masaki et al. | 318/727 |
| 2008/0106919 | A1 * | 5/2008 | Shin et al. | 363/131 |
| 2009/0323232 | A1 * | 12/2009 | Suzuki et al. | 361/23 |
| 2010/0039056 | A1 * | 2/2010 | Kobayashi et al. | 318/400.35 |
| 2010/0213769 | A1 * | 8/2010 | Sakakibara | 307/82 |

FOREIGN PATENT DOCUMENTS

| | | | |
|---|---|---|---|
| JP | 6-81514 | A | 3/1994 |
| JP | 2004-222337 | A | 8/2004 |
| JP | 2004-222338 | A | 8/2004 |
| JP | 2004-266972 | A | 9/2004 |
| JP | 2006-246673 | A | 9/2006 |
| JP | 2006-352942 | A | 12/2006 |

OTHER PUBLICATIONS

Itoh et al., "Decoupling control of input and output reactive power of the matrix converter," IEEJ Technical Meeting on Semiconductor Power Converter, SPC-01-121, 2001.

Kato et al., "Improvement of waveform for a boost type AC/DC/AC direct converter focused on input current," Heisei 19 Nen, IEE Japan, Sangyo Oyo Bumon Taikai, vol. 1-31, Aug. 20, 2007, pp. 279-282.

Kato, "Improvement of waveform for a boost type AC/DC/AC direct converter," Heisei 19 Nen, IEE Japan, Mar. 15, 2007, pp. 153-154.

Takeshita et al., "PWM scheme for current source three-phase inverters and converters," IEEJ Transactions on Industry Applications, vol. 116, No. 1, 1996, pp. 106 and 107.

Wei et al., "A novel matrix converter topology with simple commutation," IEEE IAS 2001, vol. 3, 2001, pp. 1749-1754.

* cited by examiner

F I G. 1
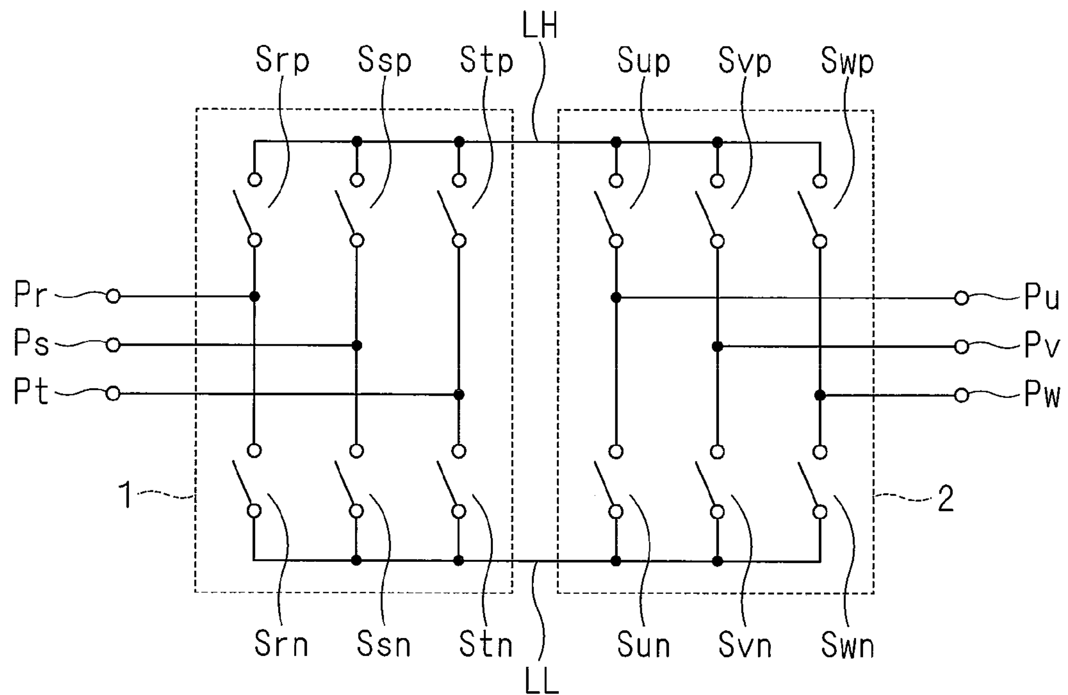
F I G. 2 A
F I G. 2 B
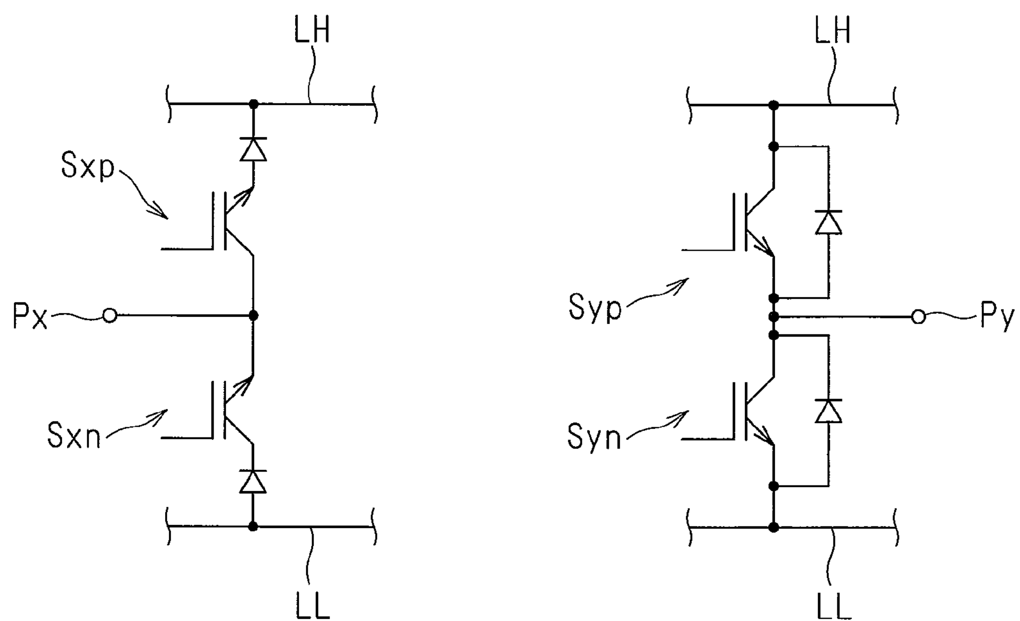

F I G . 3
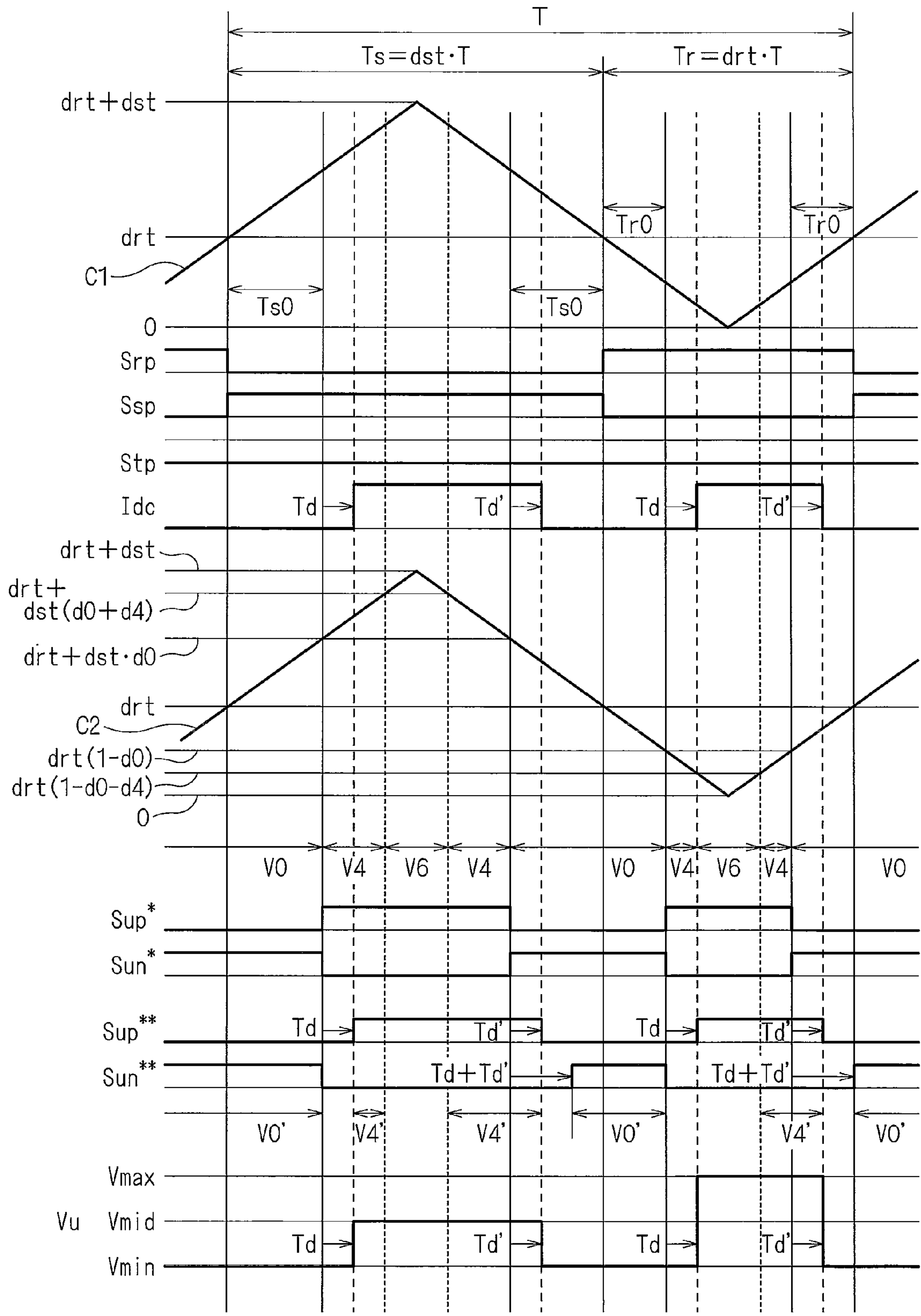

F I G. 4
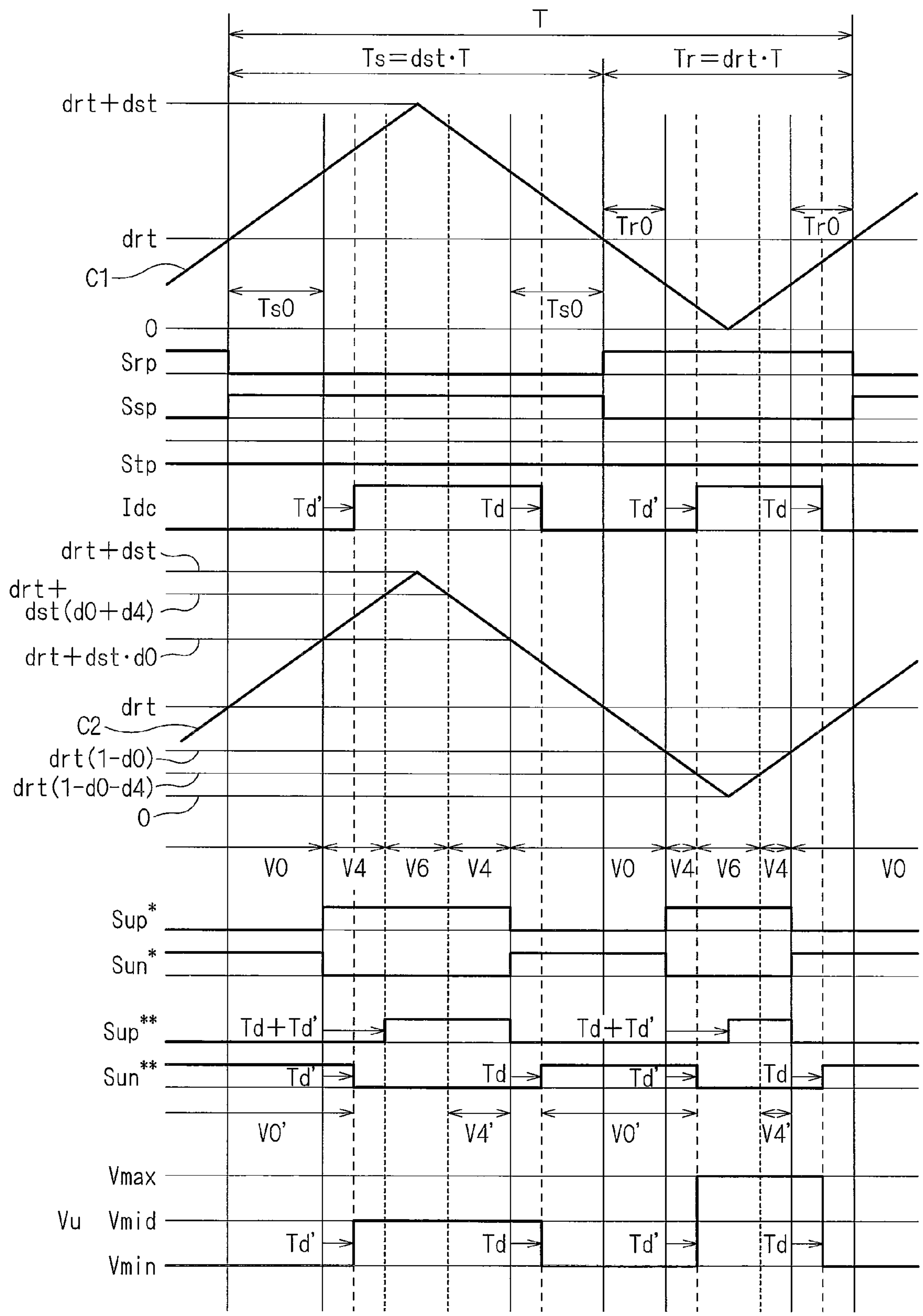

F I G. 5
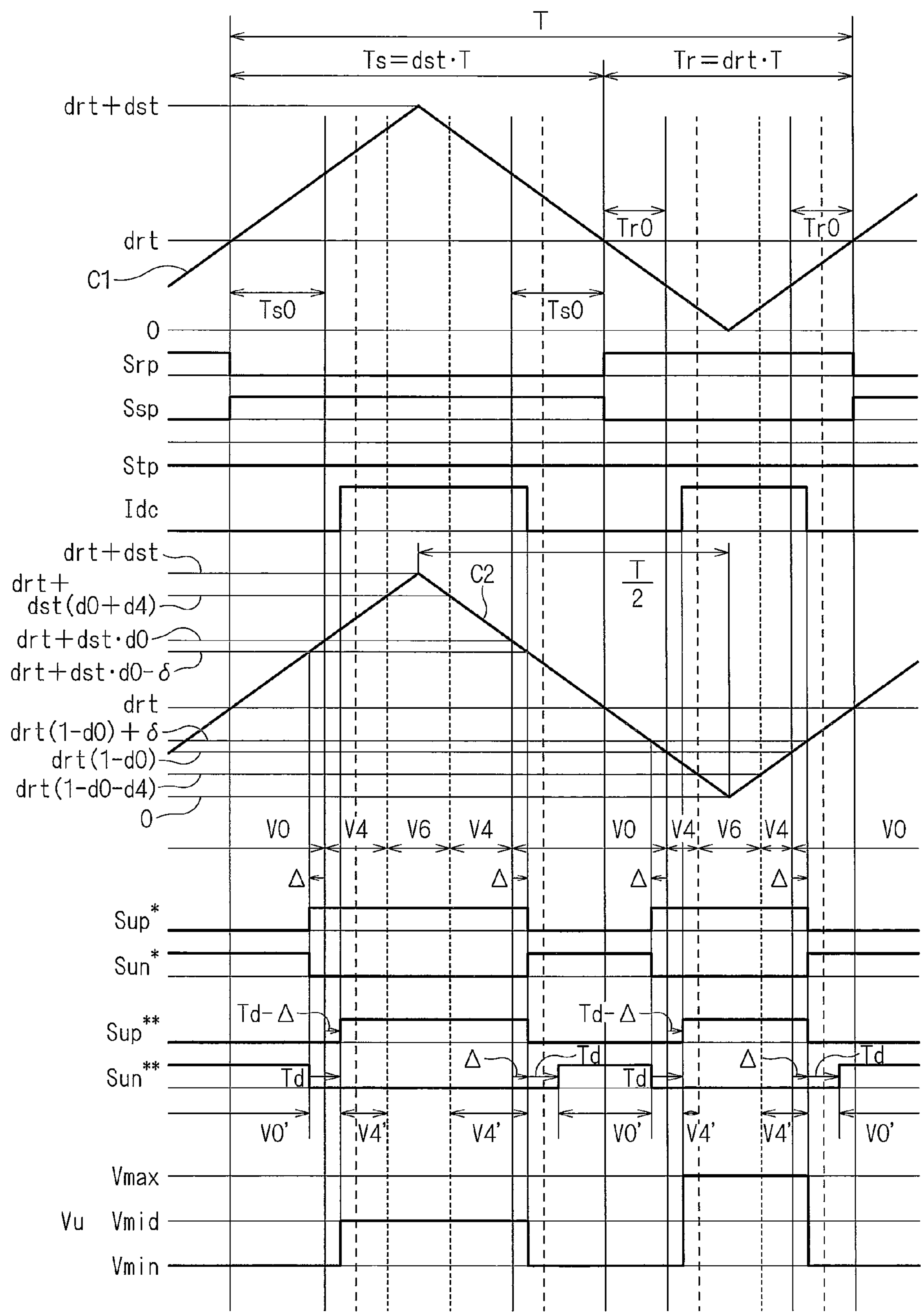

F I G. 6
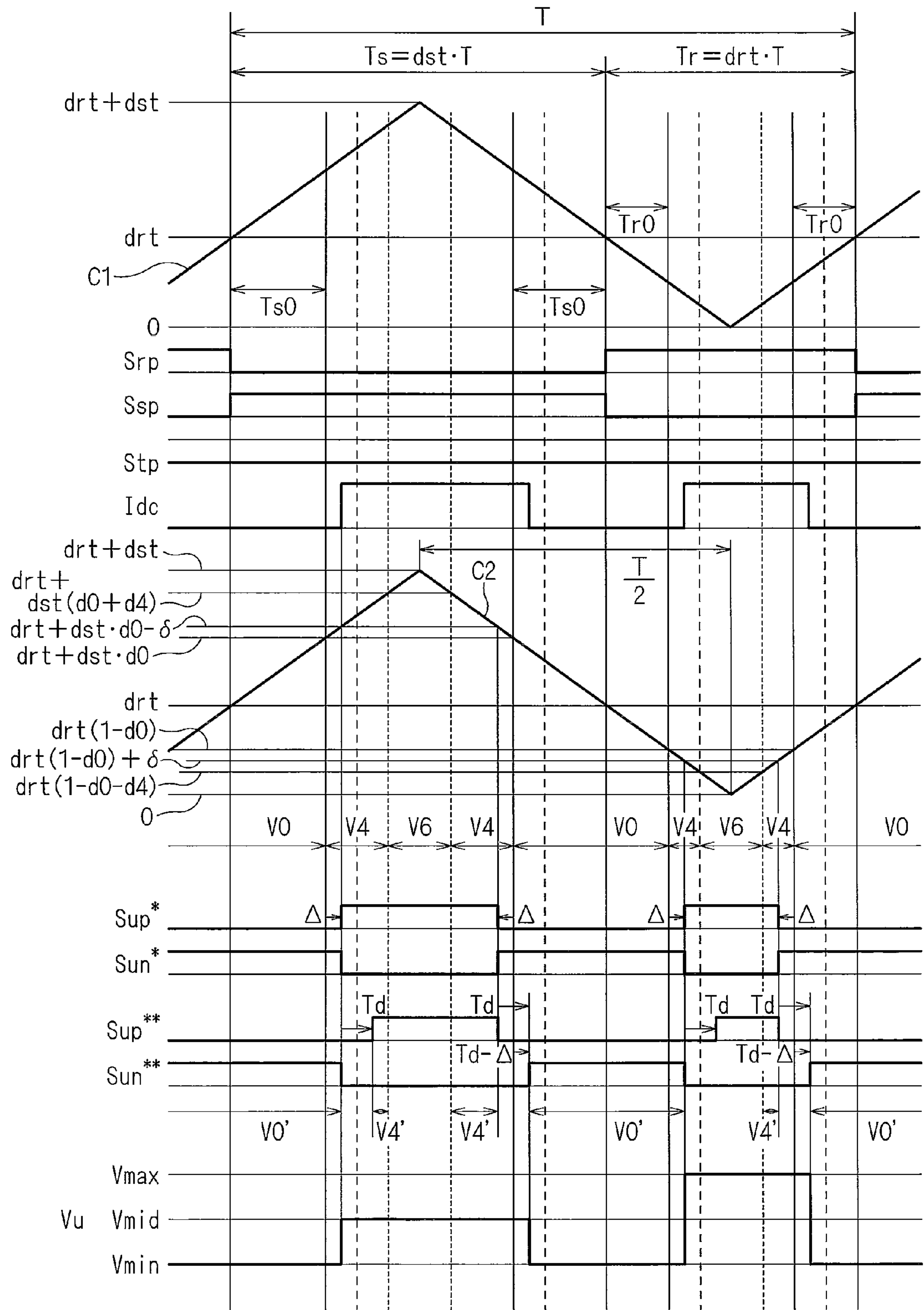

F I G. 7
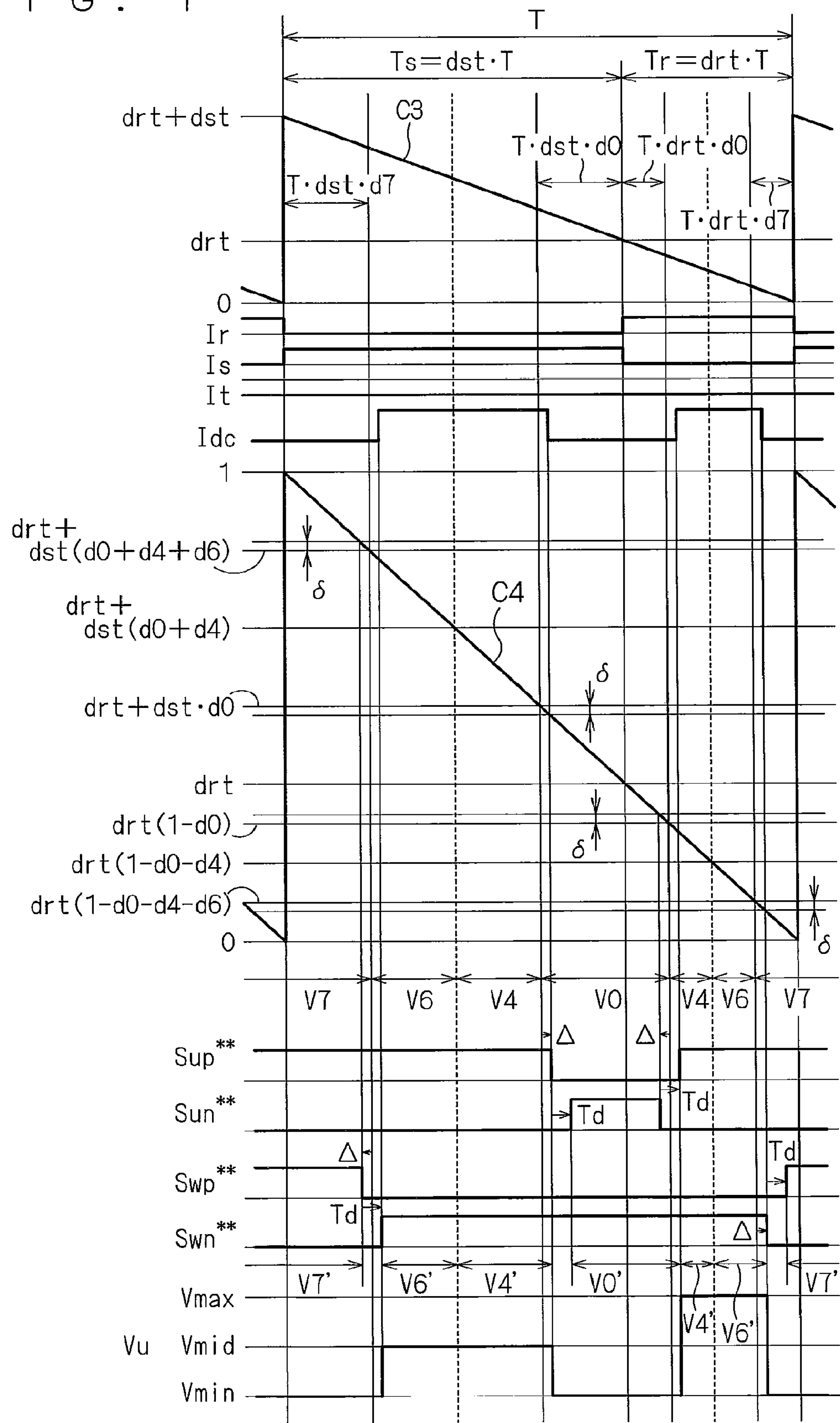

F I G. 8
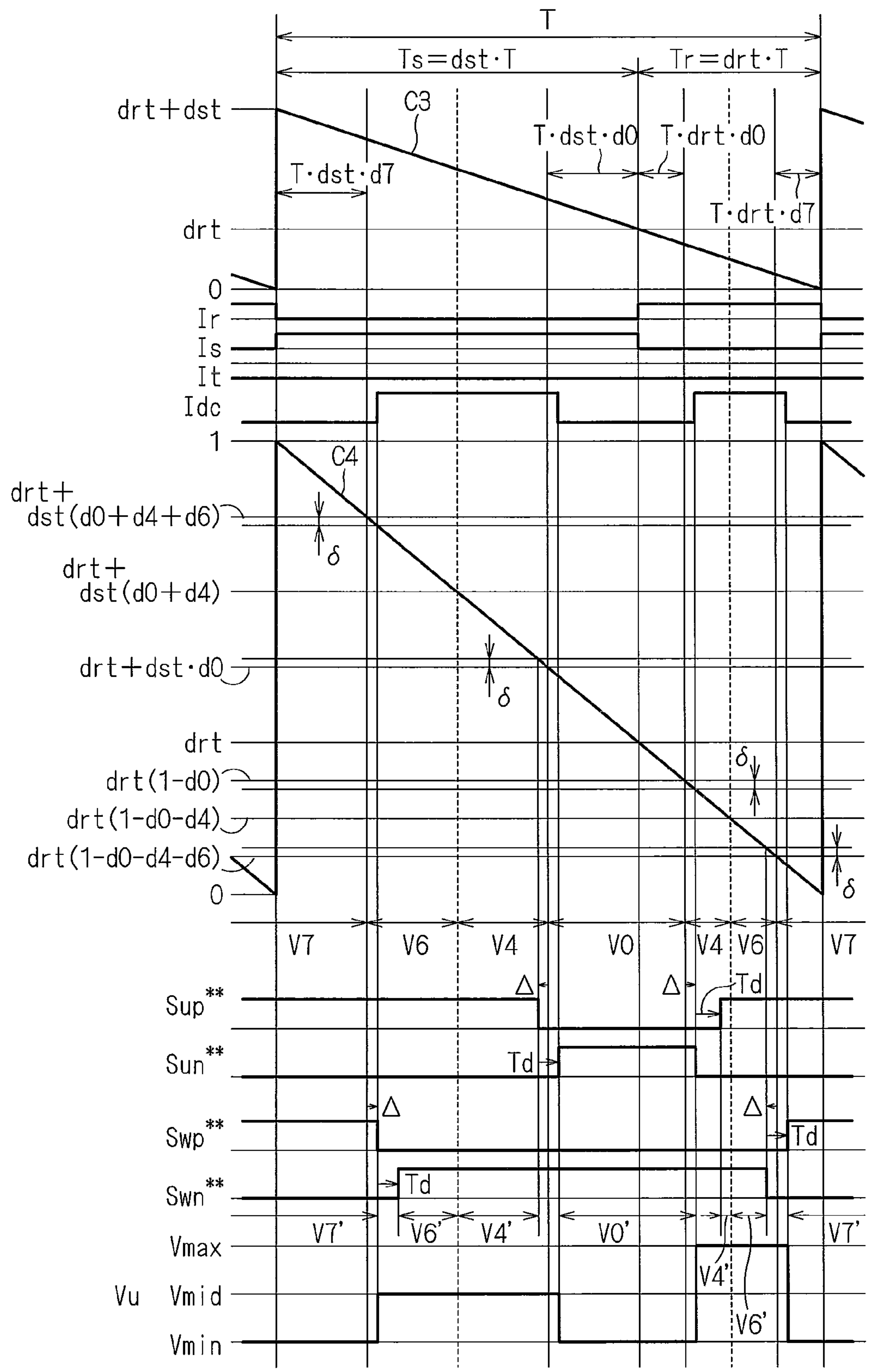

F I G. 9
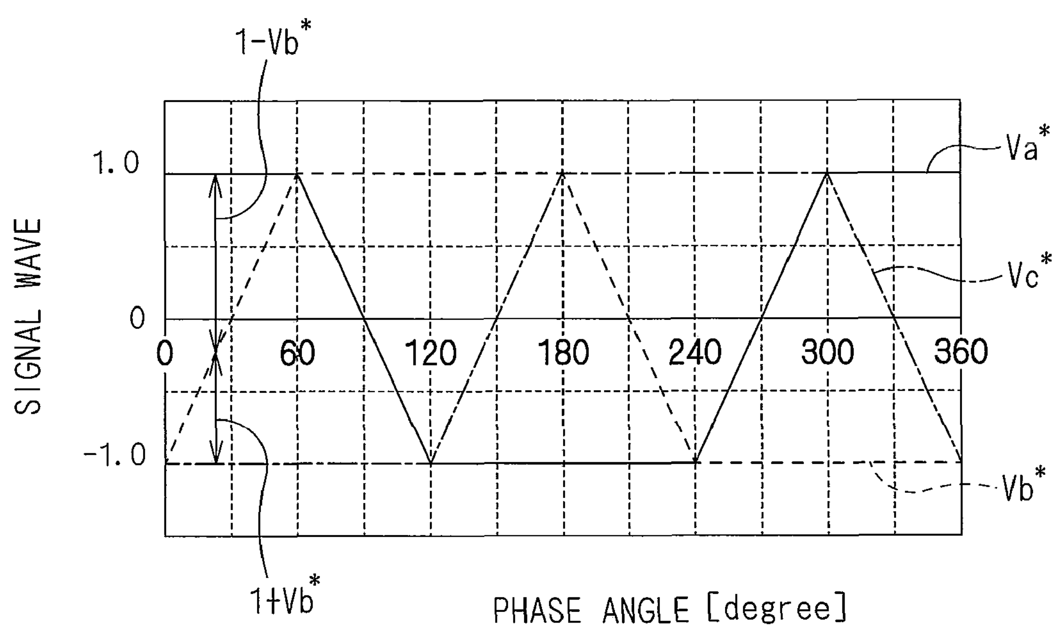

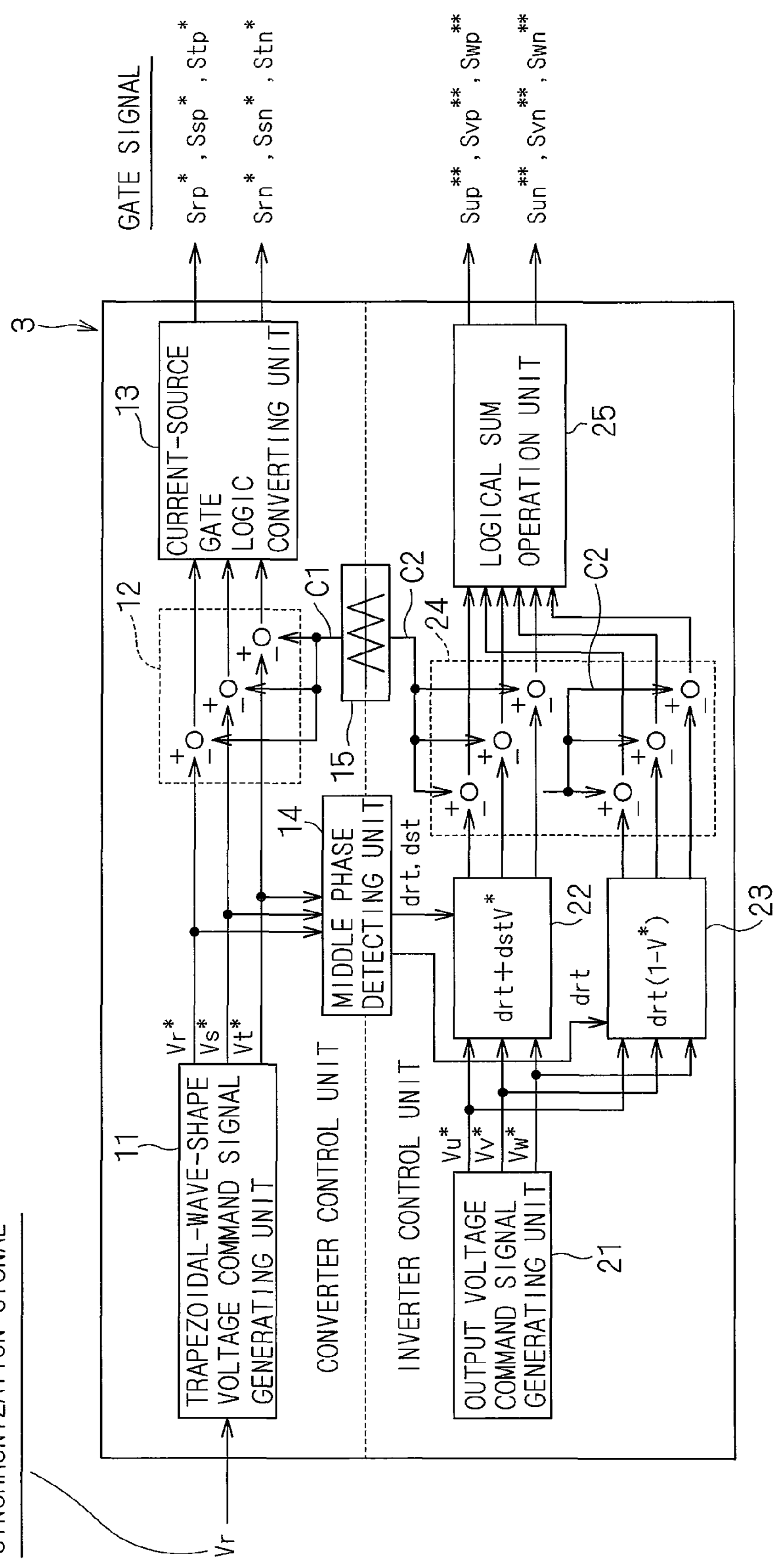

F I G . 1 0
POWER SUPPLY
SYNCHRONIZATION SIGNAL
Vr
3
11
TRAPEZOIDAL-WAVE-SHAPE VOLTAGE COMMAND SIGNAL GENERATING UNIT
Vr*
Vs*
Vt*
12
13
CURRENT-SOURCE GATE LOGIC CONVERTING UNIT
14
MIDDLE PHASE DETECTING UNIT
15
C1
C2
drt, dst
CONVERTER CONTROL UNIT
INVERTER CONTROL UNIT
21
OUTPUT VOLTAGE COMMAND SIGNAL GENERATING UNIT
Vu*
Vv*
Vw*
22
drt+dstV*
23
drt(1-V*)
drt
24
25
LOGICAL SUM OPERATION UNIT
GATE SIGNAL
Srp*, Ssp*, Stp*
Srn*, Ssn*, Stn*
Sup, Svp, Swp**
Sun, Svn, Swn**

F I G. 1 1
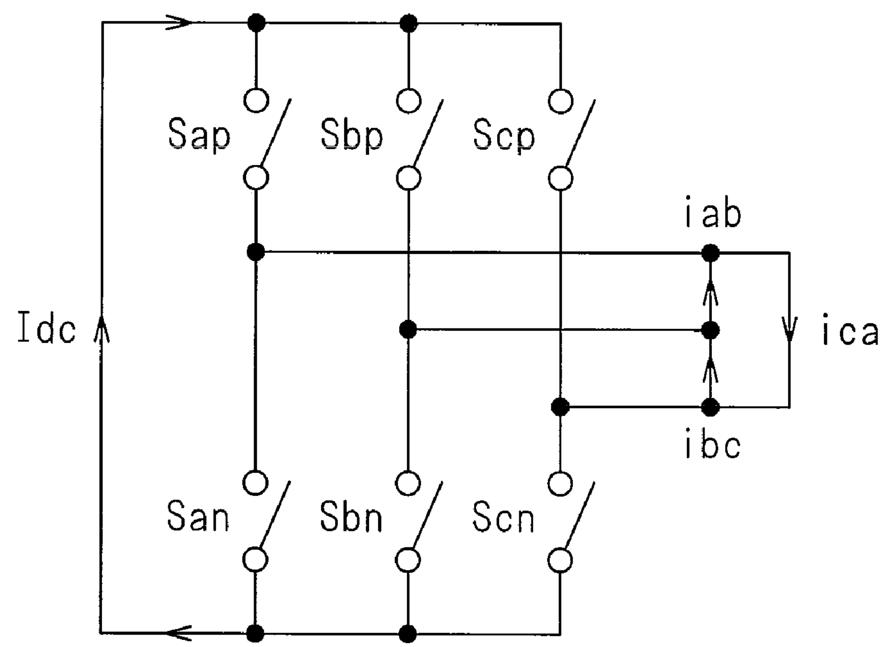

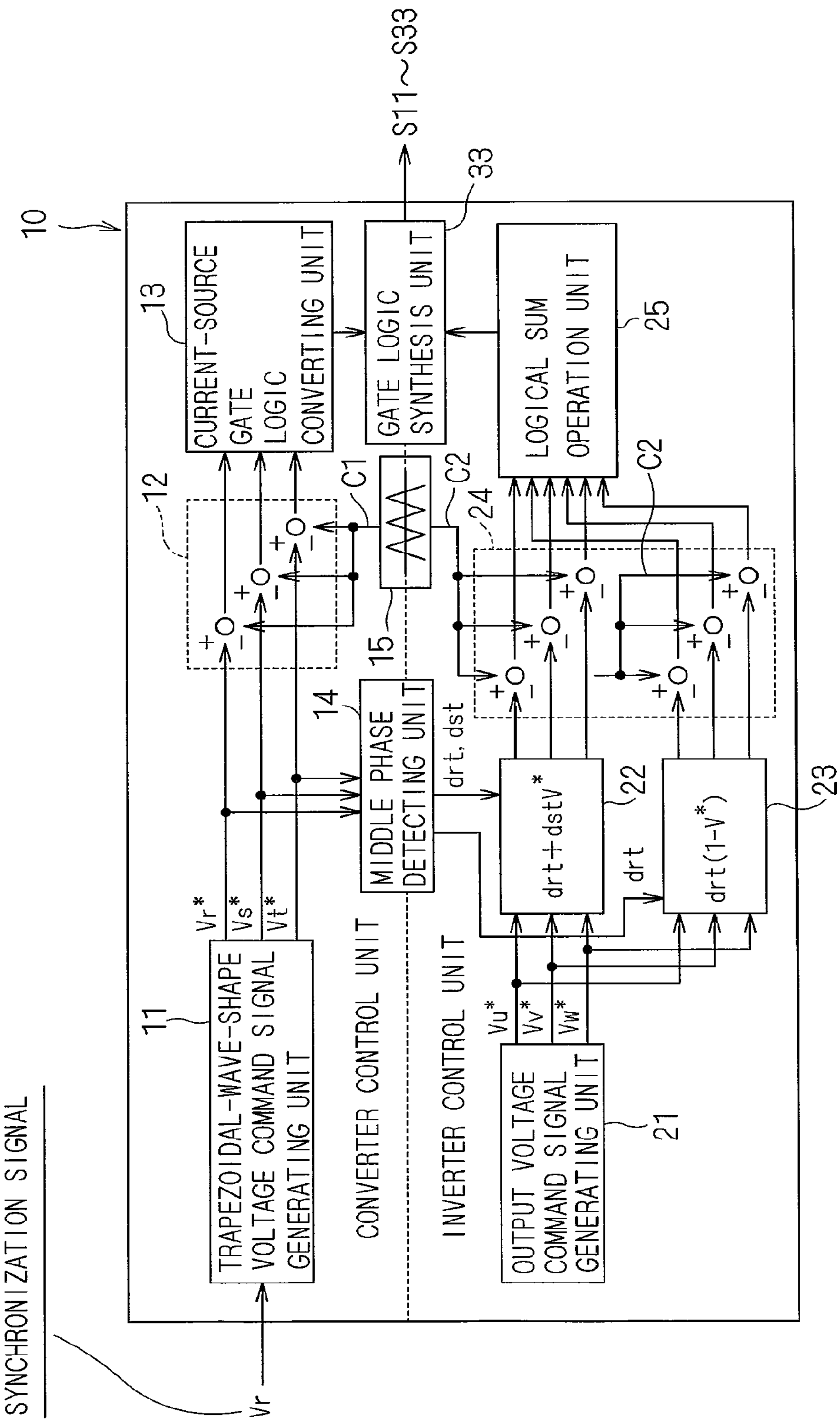
F I G . 1 5
POWER SUPPLY
SYNCHRONIZATION SIGNAL
Vr
10
TRAPEZOIDAL-WAVE-SHAPE VOLTAGE COMMAND SIGNAL GENERATING UNIT
11
Vr*
Vs*
Vt*
12
C1
13
CURRENT-SOURCE GATE LOGIC CONVERTING UNIT
14
MIDDLE PHASE DETECTING UNIT
15
drt, dst
C2
33
GATE LOGIC SYNTHESIS UNIT
S11~S33
CONVERTER CONTROL UNIT
INVERTER CONTROL UNIT
OUTPUT VOLTAGE COMMAND SIGNAL GENERATING UNIT
21
Vu*
Vv*
Vw*
drt+dstV*
22
drt
drt(1-V*)
23
24
C2
LOGICAL SUM OPERATION UNIT
25

POWER CONVERSION DEVICE

TECHNICAL FIELD

The present invention relates to a power converting apparatus which performs AC-AC conversion, and more particularly, to a power converting apparatus which is not provided with power storing means for DC link.

BACKGROUND ART

As a power converting apparatus for performing AC-AC conversion which is not provided with power storing means for DC link, there are known a matrix converter and an AC/DC/AC direct type power converter (hereinafter, referred to as "direct power converter") (for example, see Lixiang Wei and Thomas A. Lipo, "A Novel Matrix Converter Topology with Simple Commutation", IEEE IAS 2001, vol. 3, 2001, pp. 1749-1754 below). They do not employ a large electrolytic capacitor, and thus excel at miniaturization and longevity.

In a direct power converter, a converter and an inverter each subjected to pulse width modulation (PWM) control are connected via a pair of power supply lines functioning as a DC link In the DC link, a power converting apparatus, which is shown by a smoothing capacitor as an example, is omitted.

There is known that a switching pattern of the matrix converter is obtained by virtualizing a power converter in which a converter and an inverter each subjected to PWM control are connected via a DC link, and subjecting a switching pattern of the virtualized power converter to matrix conversion (for example, see Rie Itoh and Isao Takahashi, "Decoupling Control of Input and Output Reactive Power of the Matrix Converter", IEEJ Technical Meeting on Semiconductor Power Converter, SPC-01-121, 2001 below). Therefore, a direct power converter will be mainly described below.

FIG. 1 is a circuit diagram showing one mode of a direct power converter. A converter 1 and an inverter 2 are connected by a pair of DC power supply lines LH and LL. Input terminals Pr, Ps and Pt of the converter 1 receive a three-phase AC voltage, and are connected to the DC power supply line LH via switch devices Srp, Ssp and Stp on an upper arm side, respectively. In addition, the input terminals Pr, Ps and Pt are connected to the DC power supply line LL via switch devices Srn, Ssn and Stn on a lower arm side, respectively.

Output terminals Pu, Pv and Pw of the inverter 2 output the three-phase AC voltage, and are connected to the DC power supply line LH via switch devices Sup, Svp and Swp on the upper arm side, respectively. In addition, the output terminals Pu, Pv and Pw are connected to the DC power supply line LL via switch devices Sun, Svn and Swn on the lower arm side, respectively.

In the direct power converter, the switch devices Srp, Ssp and Stp on the upper arm side of the converter 1 and the switch devices Srn, Ssn and Stn on the lower arm side thereof are brought into conduction in an alternative manner for avoiding short-circuit of the input terminals Pr, Ps and Pt. Further, for avoiding short-circuit of the DC power supply lines LH and LL, the switch device on the upper arm side of the converter 1 and the switch device on the lower arm side thereof, which correspond to the same phase, are brought into conduction in an alternative manner.

The above-mentioned switching (commutation) of the converter 1 is desirably performed in a state in which current does not flow through the DC power supply lines LH and LL. In order to achieve such a state, the output terminals Pu, Pv and Pw of the inverter 2 are short-circuited, to thereby generate a state which is referred to as a so-called zero voltage vector. Specifically, the switch devices Sup, Svp and Swp on the upper arm side are all brought into conduction and all of the switch devices Sun, Svn and Swn on the lower arm side are brought into non-conduction (state referred to as a voltage vector V7). Alternatively, the switch devices Sup, Svp and Swp on the upper arm side are all brought into non-conduction and all of the switch devices Sun, Svn and Swn on the lower arm side are brought into conduction (state referred to as a voltage vector V0).

However, also in the inverter 2, the switch device on the upper arm side and the switch device on the lower side, which correspond to the same phase, are brought into conduction in an alternative manner for avoiding short-circuit between the DC power supply lines LH and LL. Accordingly, in switching of the switch devices of the inverter 2, a certain period called a dead time is provided for preventing periods in each which the switching device corresponding to the same phase is brought into conduction from overlapping each other. Then, in this period, there is provided a period in which a pair of switching devices corresponding to the same phase are brought into non-conduction (for example, see Koji Kato and Jun-ichi Itoh, "Improvement of Waveform for a Boost type AC/DC/AC Direct Converter", Year 2007 IEEJ National Convention 4-098, 2007, pp. 153 and 154 and Koji Kato and Jun-ichi Itoh, "Improvement of Waveform for a Boost type AC/DC/AC Direct Converter Focused on Input Current" Year 2007 IEEJ Industry Applied Section Meeting 1-31, pp. 279-282 below).

Further, as patent documents related to the present invention, there are Takaharu Takeshita, Koji Toyama and Nobuyuki Matsui, "PWM Scheme for Current Source Three-Phase Inverters and Converters", IEEJ Transactions on Industry Applications, Vol. 116, No. 1, 1996, pp. 106-107 and Japanese Patent Application Laid-Open No. 2004-222337 and Japanese Patent Application Laid-Open No. 06-81514.

DISCLOSURE OF INVENTION

Problems to be Solved by the Invention

For example, Koji Kato and Jun-ichi Itoh, "Improvement of Waveform for a Boost type AC/DC/AC Direct Converter", Year 2007 IEEJ National Convention 4-098, 2007, pp. 153 and 154 describes a voltage command for compensating for an output voltage error due to a dead time, but discloses that an input current error cannot be compensated. This problem is considered to be caused by the following technical background.

In order to meet a demand for suppressing a distortion of input current which arises from a zero voltage vector, a period in which the zero voltage vector is employed (hereinafter, "zero voltage vector period") is divided at a duty ratio between a pair of switching devices whose conduction and non-conduction are repeated by a converter. Under the circumstances, in the technology disclosed in Koji Kato and Jun-ichi Itoh, "Improvement of Waveform for a Boost type AC/DC/AC Direct Converter", Year 2007 IEEJ National Convention 4-098, 2007, pp. 153 and 154, the dead time is compensated on average in a period which is a sum of two types of cycles in which conduction and non-conduction of the pair of switching devices are repeated. However, an influence of the dead time exerted on a period in which each cycle is employed cannot be eliminated. This is because a value of the dead time itself is constant while the zero voltage vector period is divided at the above-mentioned ratio. In other words, in the technology of Koji Kato and Jun-ichi Itoh, "Improvement of Waveform for a Boost type AC/DC/AC Direct Converter", Year 2007 IEEJ National Convention 4-098, 2007, pp. 153 and 154, a value of the dead time itself is not compensated.

In Koji Kato and Jun-ichi Itoh, "Improvement of Waveform for a Boost type AC/DC/AC Direct Converter Focused on Input Current" Year 2007 IEEJ Industry Applied Section Meeting 1-31, pp. 279-282, a value of the dead time itself is compensated, and thus contrary to Koji Kato and Jun-ichi Itoh, "Improvement of Waveform for a Boost type AC/DC/AC Direct Converter", Year 2007 IEEJ National Convention 4-098, 2007, pp. 153 and 154, a complicated logic needs to be employed for switching control by an inverter.

The aforementioned problems result from employing different carriers by an inverter and a converter as a technique of dividing a zero voltage vector period at the above-mentioned duty ratio in Koji Kato and Jun-ichi Itoh, "Improvement of Waveform for a Boost type AC/DC/AC Direct Converter", Year 2007 IEEJ National Convention 4-098, 2007, pp. 153 and 154 and Koji Kato and Jun-ichi Itoh, "Improvement of Waveform for a Boost type AC/DC/AC Direct Converter Focused on Input Current" Year 2007 IEEJ Industry Applied Section Meeting 1-31, pp. 279-282. That is, those problems result from a fact that the duty ratio is determined by a ratio at which a carrier of the converter is internally divided by a command value while a slope of a carrier of the inverter is determined in accordance with the ratio.

Therefore, an object of the present invention is to provide a technology of employing the same carrier in an inverter and a converter and removing, in principle, a distortion of input current which results from a zero voltage vector period as well as a distortion of input current which results from dead time, to thereby perform PWM control on the inverter and the converter without performing complicated operation.

Means to Solve the Problems

A first aspect of the present invention relates to a power converting apparatus including: three input terminals (Pr, Ps, Pt) respectively receiving a phase voltage of three-phase AC; three output terminals (Pu, Pv, Pw); first and second DC power supply lines (LH, LL); a converter (1) including a first switch device group including three switch devices (Srp, Ssp, Stp) connected between each of the input terminals and the first DC power supply line and three switch devices (Srn, Ssn, Stn) connected between each of the input terminals and the second DC power supply line; a voltage-source inverter (2) including a second switch device group including three switch devices (Sup, Svp, Swp) connected between each of the output terminals and the first DC power supply line and three switch devices (Sun, Svn, Swn) connected between each of the output terminals and the second DC power supply line, and employing a dead time (Td) in switching of the second switch device group; a carrier generating unit (15) generating a carrier showing a triangular wave in which an absolute value of a slope is constant with respect to time; converter gate signal generating units (11 to 13) performing commutation of the converter at a timing at which the carrier takes a first reference value (drt) for internally dividing an interval from a minimum value to a maximum value of the carrier at a ratio between a first value (drt) and a second value (dst); and inverter gate signal generating units (21 to 25), where a first command value is a value smaller by the predetermined value than a second reference value (drt+dst·d0) for internally dividing an interval from the first reference value to the maximum value at a ratio between a third value (d0) and a fourth value (d4+d6) and a second command value is a value larger by a predetermined value than a third reference value (drt·(1−d0)) for internally dividing an interval from the minimum value to the first reference value at the ratio between the fourth value and the third value, allowing to employ a zero voltage vector as a switching mode of the inverter in a period in which the carrier takes the second command value to the first command value.

An absolute value of the predetermined value is a value obtained by multiplying a difference between the maximum value and the minimum value of the carrier by a length of the dead time to be divided by a cycle of the carrier.

The predetermined value takes a positive value in a case where a load current flowing to the output terminal (Pu) being kept in conduction with the first DC power supply line in a period sandwiched between periods employing the zero voltage vector flows out of the inverter, and the predetermined value takes a negative value in a case where the load current flows into the inverter.

A second aspect of the present invention relates to a power converting apparatus including: three input terminals (Pr, Ps, Pt) respectively receiving a phase voltage of three-phase AC; three output terminals (Pu, Pv, Pw); first and second DC power supply lines (LH, LL); a converter (1) including a first switch device group including three switch devices (Srp, Ssp, Stp) connected between each of the input terminals and the first DC power supply line and three switch devices (Sm, Ssn, Stn) connected between each of the input terminals and the second DC power supply line; an inverter (2) including a second switch device group including three switch devices (Sup, Svp, Swp) connected between each of the output terminals and the first DC power supply line and three switch devices (Sun, Svn, Swn) connected between each of the output terminals and the second DC power supply line, and employing a dead time (Td) in switching of the second switch device group; a carrier generating unit (15) generating a carrier showing a sawtooth wave having a linear slope with respect to time; converter gate signal generating units (11 to 13) performing commutation of the converter at a timing at which the carrier takes a first reference value (drt) for internally dividing an interval from a minimum value to a maximum value in a period when the carrier slopes at a ratio between a first value (drt) and a second value (dst) and a timing at which the carrier takes transition between the minimum value and the maximum value; and inverter gate signal generating units (21 to 25) allowing the inverter to perform switching based on a second reference value (drt+dst·d0) and a third reference value (drt+dst(d0+d4+d6)) for internally dividing an interval from the first reference value to the maximum value at a ratio among a third value (d0), a fourth value (d4+d6) and a fifth value (1−d0−d4−d6) in this order, and a fourth reference value (drt(1−d0)) and a fifth reference value (drt(1−d0−d4−d6)) for internally dividing an interval from the first reference value to the minimum value at a ratio among the third value, the fourth value, and the fifth value in this order.

In the inverter gate signal generating units, a first command value is a value smaller than the third reference value by a predetermined value, a second command value is a value larger than the second reference value by the predetermined value, a third command is a value smaller than the fourth reference value by a predetermined value, and a fourth command value is a value larger than the fifth reference value by the predetermined value. In addition, the inverter gate signal generating units allow to employ a first zero voltage vector (V0) as a switching mode of the inverter in a period in which the carrier takes the second command value to the third command value, and employ a second zero voltage vector (V7) as the switching mode of the inverter in a period in which the carrier takes no less than the first command value or no more than the fourth command value.

An absolute value of the predetermined value is a value obtained by multiplying a difference between the maximum value and the minimum value of the carrier by a length of the dead time to be divided by double a cycle of the carrier.

The predetermined value takes a positive value in a case in a case where a load current flowing to the output terminal (Pu; Pw) being kept in conduction with the first DC power supply line in a period sandwiched between periods employing the first zero voltage vector and the second zero voltage vector flows out of the inverter, and the predetermined value takes a negative value in a case where the load current flows into the inverter.

According to a third aspect of the power converting apparatus of the present invention, in the first or second aspect, commutation of the converter is defined by a comparison between the carrier and a trapezoidal wave having 360-degree cycle and having a pair of flat sections with a 120-degree deviation from each other and having a pair of slope areas linking the pair of flat sections. The minimum value and the maximum value of the carrier are represented by m and M, respectively, and in an area they increase along with an increase in phase angle of the slope area of the trapezoidal wave, the trapezoidal wave takes $((m+M)+\sqrt{3}(M-m)\cdot\tan(\phi-\pi/6))/2$ where a phase angle $\phi$ indicating being within the slope area is 0 to $\pi/3$ radians; and in an area they decrease along with an increase in phase angle of the slope area of the trapezoidal wave, the trapezoidal wave takes $((m+M)-\sqrt{3}\cdot(M-m)\cdot\tan(\phi-\pi/6))/2$ where a phase angle $\phi$ indicating being within the slope area is 0 to $\pi/3$ radians.

Effects of the Invention

According to the first aspect of the power converting apparatus of the present invention, the slope of the waveform of the carrier is constant before and after commutation of the converter, and thus the period in which the switching mode of the inverter employs the zero voltage vector is divided proportionally at the ratio between the first value and the second value. In addition, a ratio between a first conduction state and a second conduction state of the converter is equal to the ratio between the first value and the second value. As a result, the period in which the current does not flow is generated in proportion to a length of each period in each of the first conduction state and the second conduction state. Therefore, the distortion of input current, which results from a fact that the inverter employs the zero voltage vector, is removed.

Moreover, between when commutation is performed from the first conduction state to the second conduction state and when commutation is performed from the second conduction state to the first conduction state is performed, the slopes of the carrier are equal to each other in absolute value and different from each other in positive and negative signs. Accordingly, it is possible to provide the dead time upon a start and an end of a state in which the switching mode of the inverter employs ones other than the zero voltage vector. Moreover, it is possible to provide the dead time corresponding to a direction of a load current of the inverter, which removes a distortion of input current which results from provision of the dead time.

According to the second aspect of the power converting apparatus of the present invention, the slope of the carrier is constant before and after commutation of the converter, or the converter undergoes commutation when the carrier changes between the minimum value and the maximum value. As a result, the period in which the switching mode of the inverter employs the first zero voltage vector and the period in which the switching mode of the inverter employs the second zero voltage vector are both divided proportionally at the ratio between the first value and the second value before and after commutation of the inverter. In addition, a ratio of periods between the first conduction state and the second conduction state is equal to the ratio between the first value and the second value as well. Accordingly, a period in which current does not flow is generated in each of the first conduction state and the second conduction state in proportion to the length of each of those periods. Therefore, a distortion of input current, which results from a fact that the inverter employs the zero voltage vector, is removed.

Moreover, upon a start and an end of the state in which the switching mode of the inverter employs ones other than the zero voltage vector, it is possible to provide a dead time. Further, it is possible to set the dead time corresponding to a direction of a load current of the inverter, which removes a distortion of input current which results from provision of the dead time.

According to the third aspect of the power converting apparatus of the present invention, a first reference value for internally dividing a value between the minimum value and the maximum value of the carrier at a ratio between the first value and the second value is supplied by a trapezoidal wave.

The object, features, aspects, and advantages of the present invention will be more apparent from the following detailed description in conjunction with the attached drawings.

BRIEF DESCRIPTION OF DRAWINGS

FIG. 1 is a circuit diagram showing an aspect of a direct power converter;

FIG. 2 are circuit diagrams showing configurations of switch devices as examples;

FIG. 3 is a timing chart showing a switching operation in a first embodiment;

FIG. 4 is another timing chart showing the switching operation in the first embodiment;

FIG. 5 is a timing chart showing a switching operation in a second embodiment of the present embodiment;

FIG. 6 is another timing chart showing the switching operation in the second embodiment;

FIG. 7 is a timing chart showing a switching operation in a third embodiment;

FIG. 8 is another timing chart showing the switching operation in the third embodiment;

FIG. 9 is a graph showing voltage commands as an example;

FIG. 10 is a block diagram showing a control circuit for obtaining a switch command;

FIG. 11 is a circuit diagram showing a configuration of an inverter;

FIG. 15 is a block diagram of a control circuit which controls switch devices of the matrix converter.

BEST MODES FOR CARRYING OUT THE INVENTION

Figure 12:
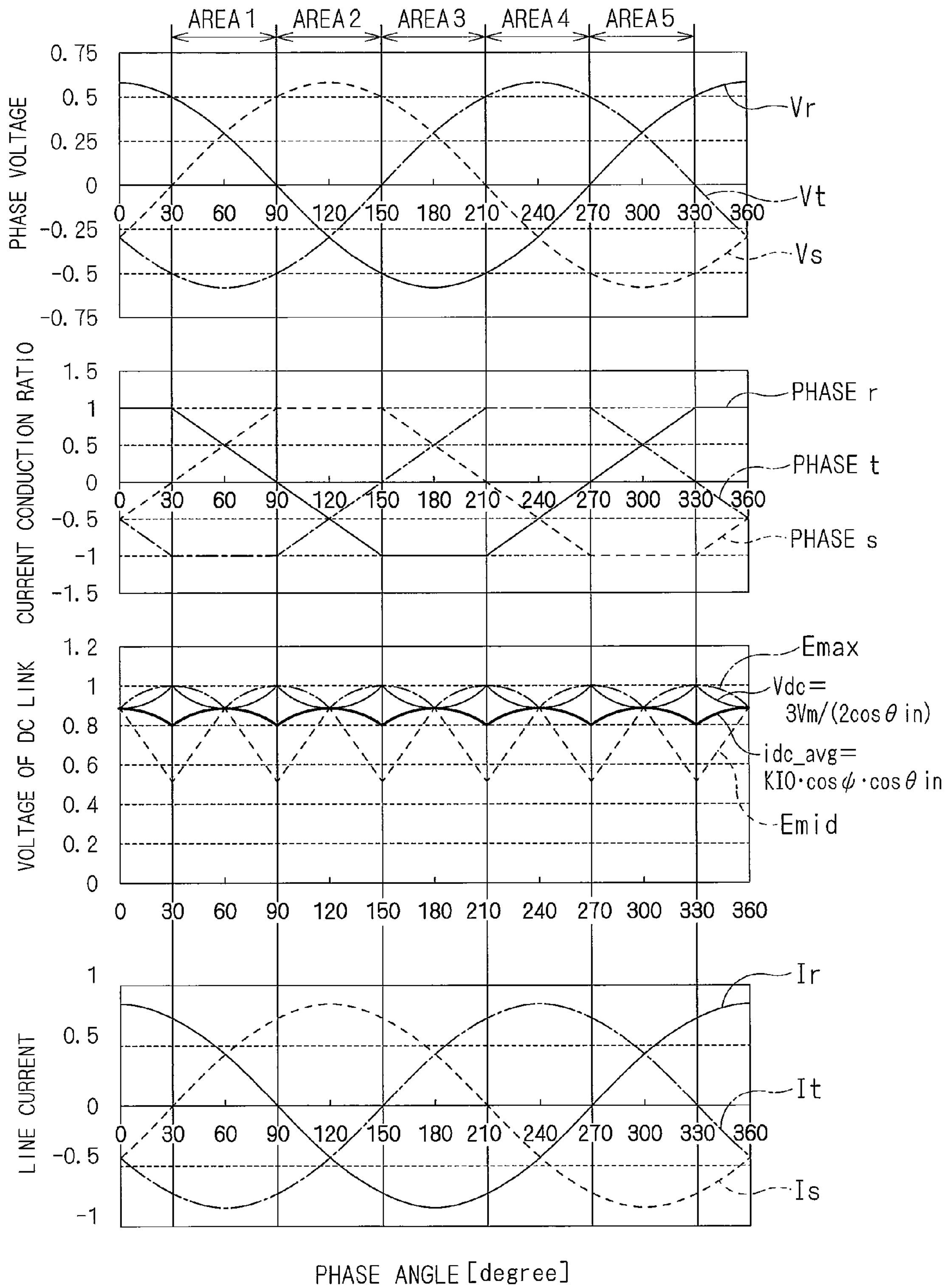
FIG. 12 is a graph showing, as an example, a phase voltage, current conduction ratios of respective phases, a DC link voltage, and an input current.

Hereinafter, description will be given of a method of improving a waveform of input current in a direct power converter shown in FIG. 1.

First Embodiment

Hereinafter, description will be given of a case, as an example, in which switch devices Stp and Stn are brought into non-conduction and conduction, respectively (case where an input terminal Pt is connected to a DC power supply line LL), for simplicity of description. Accordingly, in switching of a converter 1 in this case, switch devices Srn and Ssn are in non-conduction and switch devices Srp and Ssp are brought into conduction in an exclusive manner. Needless to say, there may occur a state in which the input terminal Pr for an r-phase or the input terminal Ps for an s-phase are connected to the DC power supply line LL, and types of phases are appropriately read in that case.

FIG. 2 are circuit diagrams showing, as examples, configurations of switch devices employed in the converter 1 and an inverter 2. The switch devices employed for the converter 1 (figure (a)) may be configured such that a high-speed diode and an IGBT are connected in series with each other. As the switch devices employed for the inverter 2, for example, IGBTs with freewheeling diode may be employed (figure (b)). Here, a letter x represents letters r, s and t, and a letter y represents letters u, v and w.

FIG. 3 and FIG. 4 are timing charts showing switching operations in the first embodiment. A triangular wave having the same absolute value of slope with respect to time is employed as a carrier C1 of the converter 1. The carrier C1 and a command value are compared with each other, to thereby perform switching of the converter 1. In the following, the command value is approximated so as to be constant within a range indicated by the drawings. In actuality, the command value is updated for, for example, every period multiple of a cycle of a carrier.

In this case, exclusive conduction of the switch devices Srp and Ssp in the state where the switch device Stn is in conduction is taken into consideration, and thus the command value is set based on a duty at which the switch devices Srp and Ssp are brought into conduction. For the sake of simplification, a peak-to-peak amplitude of the carrier C1 is set to one in FIG. 3. In addition, for the sake of simplification, description will be given assuming that the minimum value is 0 and the maximum value is 1 unless otherwise noted. The following description is appropriate if the proportion is taken into consideration even in a case where the carrier C1 has a different amplitude, or if a shift of the carrier C1 is taken into consideration even in a case where the carrier C1 has a different center value.

The switch device Stp is in non-conduction, and a duty at which it is brought into conduction is regarded as 0. Accordingly, if the duties of the switch devices Srp and Ssp are values drt and dst, respectively, a sum of the values drt and dst is one.

The absolute values of slope of the carrier C1 are the same as described above. Therefore, the switch device Srp is brought into conduction in a case where the carrier C1 takes value 0 to drt, and the switch device Ssp is brought into conduction in a case where the carrier C1 takes the value drt to 1, whereby conduction periods thereof correspond to the above-mentioned duties.

Accordingly, control is made such that the switch device Srp is brought into conduction when the carrier C1 has the value drt or less, and that switch device Ssp is brought into conduction when the carrier C1 has the value drt or more. In FIG. 3 and FIG. 4, upper side/lower side of graphs represent conduction/non-conduction of the switch devices Srp, Ssp and Stp, respectively.

By employing the switching as described above, one cycle T of the carrier C1 is divided into a period Ts where the carrier C1 has the value drt which is the command value or more and a period Tr where the carrier C1 has the command value or less, which are calculated by dst·T and drt·T, respectively.

Next, description will be given of how to achieve the zero voltage vector. As described above, the period of the zero voltage vector is desirably divided at a ratio between the periods Ts and Tr in the periods Ts and Tr, respectively. Therefore, in the present embodiment, the same one as the carrier C1 of the converter C1 is employed for a carrier C2 of the inverter 2, the value drt is considered to be a reference value, and a command value of the inverter 2 is provided in each of the side where a value is larger than the reference value and the side where a value is smaller the reference value.

Specifically, as an example, description will be given of a case where the inverter 2 performs switching in which voltage vectors V0 (000), V4 (100), V6 (110) and V4 (100) are repeatedly employed in this order. That is, as an example, there is employed a case where the switch devices Sup, Sun, Svp and Svn are switched in the state where the switch devices Swp and Swn are in non-conduction state and conduction state, respectively (case where the output terminal Pw is connected to the DC power supply line LL). Needless to say, there may occur a state in which an output terminal Pu for a u-phase and an output terminal Pv for a v-phase are connected to the DC power supply line LL, and in such a case, it is only required to appropriately read types of phases.

Values d0, d4 and d6 represent a duty at which the voltage vector V0 for bringing all of the switch devices Sup, Svp and Swp into non-conduction is employed, a duty at which the voltage vector V4 for bringing the switch device Sup into conduction and the switch devices Svp and Swp into non-conduction is employed, and a duty at which the voltage vector V6 for bringing the switch devices Sup and Svp into conduction and the switch device Swp into non-conduction is employed, respectively, where d0+d4+d6=1.

In the carrier C2, the period Tr in which a value equal to or larger than the value drt is taken is divided at a ratio among d0, d4 and d6, and the period Ts in which a value equal to or smaller than the value drt is taken is divided at the ratio among d0, d4 and d6. The switch device Swp is in non-conduction, and thus a duty at which it is brought into conduction is considered to be 0. Therefore, by the above-mentioned division, it is possible to divide the period in which the voltage vector V0 is employed at a ratio between the values dst and drt without impairing the duty of the voltage vector in the inverter 2.

Specifically, switching of the inverter 2 is controlled as follows (switch devices Swp and Swn are in non-conduction and conduction, respectively).

In a case where the carrier C2 takes values drt(1−d0) to drt+dst·d0, the voltage vector V0 is employed. In a case where the carrier C2 takes a value drt(1−d0−d4) to the drt(1−d0) or the value drt+dst·d0 to a value drt+dst(d0+d4), the voltage vector V4 is employed. In a case where the carrier C2 takes a value 0 to the value drt(1−d0−d4) or a value drt+dst(d0+d4) to a value drt+dst=1, the voltage vector V6 is employed.

The carrier C2 has the same waveform as the carrier C1 and takes a triangular wave having the same absolute value of slope with respect to time, and thus a period Ts0 below is taken during the period of the voltage vector V0 in the period Ts on both a positive slope side and a negative slope side.

[Equation 1]

$$Ts0=((drt+dst\cdot d0)-drt)\times T/2=d0\cdot dst\cdot(T/2) \quad (1)$$

Similarly, a period Tr0 below is taken during the period of the voltage vector V0 in the period Tr on both the positive slope side and the negative slope side.

[Equation 2]

$$Tr0=(drt-drt(1-d0))\times T/2=d0\cdot drt\cdot(T/2) \quad (2)$$

Accordingly, the periods of the zero voltage vector are drt·d0·T and dst·d0·T in the periods Tr and Ts, respectively, which enables allocation at the ratio between the values drt and dst. Therefore, it is possible in principle to remove a distortion of an input current which results from the zero voltage vector period.

Moreover, the period of the voltage vector V4 in each cycle T of the carrier C2 is represented as follows.

[Equation 3]

$$((drt+dst(d0+d4))-(drt+dst\cdot d0)+drt(1-d0)-drt(1-d0-d4))\times T/2\times 2=d4(dst+drt)\cdot T \quad (3)$$

The period of the voltage vector V6 in each cycle T of the carrier C2 is represented as follows.

[Equation 4]

$$((drt+dst)-(drt+dst(d0+d4))+drt(1-d0-d4)-0)\times T/2\times 2=T\cdot(dst+drt)(1-d0-d4)=d6(dst+drt)\cdot T \quad (4)$$

Further, the period of the voltage vector V0 in each cycle T of the carrier C2 is represented as follows.

[Equation 5]

$$drt\cdot d0\cdot T+dst\cdot d0\cdot T=d0(dst+drt)\cdot T \quad (5)$$

Accordingly, in each cycle T of the carrier C2, the periods of the voltage vectors V0, V4 and V6 are achieved at the ratio among the values d0, d4 and d6.

Next, compensation for a dead time will be described. Here, description will be given by taking an output of the u-phase as an example. Without consideration of the dead time, the switching device Sup is brought into non-conduction, conduction and conduction correspondingly to the voltage vectors V0, V4 and V6, respectively, and the switching device Sun is brought into conduction and non-conduction in a complementary manner with the switching device Sup. In FIG. 3, commands Sup* and Sun* represent switching commands in a case where the dead time is not provided. The command Sup* takes "1"/"0" (in the figure, represented by the upper side/lower side), whereby the corresponding switching device Sup is respectively brought into conduction/non-conduction (in a case where the dead time is not provided). The same holds true for the command Sun* and the conduction/non-conduction of the switching device Sun corresponding to this. Accordingly, the output terminal Pu is kept in conduction with the DC power supply line LH with the voltage vectors V4 and V6 employed by the inverter 2 other than the zero voltage vector V0.

First, with reference to FIG. 3, the dead time in a case where a load current is positive will be discussed, where a direction in which the load current flows from the output terminal Pu (see FIG. 1) is made to be positive. An output potential Vu is represented as a potential Vmax of the maximum phase among the r-phase, s-phase and t-phase, a potential Vmid of a middle phase thereamong, and a potential Vmin of the minimum phase thereamong (in this case, represented by s-phase, r-phase and t-phase, respectively). The load current flowing in the dead time flows through the freewheeling diode of the lower arm, and thus the output terminal Pu is connected to the DC power supply line LL. Therefore, the periods in which the output potential Vu takes the potentials Vmax and Vmid become shorter by the dead time period.

In order to secure a dead time while compensating for an output voltage error as described above, there is employed a command Sup** which rises with a delay from rising of the command Sup* by the dead time Td and falls with a delay from falling of the command Sup* by a period Td' equal to the dead time Td. In addition, in order to secure the dead time Td, there is employed a command Sun** which falls at the timing of falling of the command Sun* and rises with a delay from rising of the command Sun* by a time Td+Td'(=2Td) for compensating for an output voltage error. Then, the commands Sup and Sun control conduction/non-conduction of the switching devices Sup and Sun, respectively.

Koji Kato and Jun-ichi Itoh, "Improvement of Waveform for a Boost type AC/DC/AC Direct Converter Focused on Input Current" Year 2007 IEEJ Industry Applied Section Meeting 1-31, pp. 279-282 suggests the compensation for the dead time Td as described above, which is effective also in the present embodiment. The start timing of a period in which the potential Vu takes the potential Vmid of the middle phase is delayed by providing the dead time Td, and an end timing thereof is also delayed in the same span as the dead time through the above-mentioned compensation. Therefore, a length of this period is compensated. The same holds true for the periods in which the potential Vmax of the maximum phase is taken and the potential Vmin of the minimum phase is taken.

Further, the dead time Td is generally short, and hence the following relationship is generally established.

[Equation 6]

$$(T/2)\cdot dst\cdot d0>2Td,(T/2)\cdot dst\cdot d0>2Td \quad (6)$$

Accordingly, in a case where the compensation for the dead time Td which is suggested in Koji Kato and Jun-ichi Itoh, "Improvement of Waveform for a Boost type AC/DC/AC Direct Converter Focused on Input Current" Year 2007 IEEJ Industry Applied Section Meeting 1-31, pp. 279-282 is employed in the present embodiment as described above, this compensation does not straddle a boundary between the periods Tr and Ts. For this reason, the compensation for the dead time Td generated in the period Tr is within the period Tr, and the compensation for the dead time Td generated in the period Ts is within the period Ts. Therefore, it is possible in principle to remove a distortion of an input current which results from the dead time in the current flowing through the DC link (more specifically, current flowing through the DC power supply lines LL and LH). Moreover, the timing at which the command Sup rises and the timing at which the command Sun falls are employed based on the timing at which the command Sup* rises and the timing at which the command Sun* falls, that is, the command values drt+dst·d0 and drt(1−d0), with the result that the commands Sup and Sun are generated without complicated operation.

FIG. 3 shows a current Idc flowing through the DC link. As described above, the ratio between the periods Ts0 and Tr0 of the zero voltage vector is equal to the ratio between the periods Ts and Tr. Accordingly, a period in which the current should flow owing to conduction of the switch devices Ssp and Srp but does not flow due to the period of the zero voltage vector is allocated to the periods Ts and Tr at the ratio between the duties dst and drt of the switch devices Ssp and Srp. In addition, a timing at which the current Idc starts flowing is delayed by the dead time Td, and a timing at which the current Idc finishes flowing is delayed by compensation for the dead time, whereby a length of a period in which the current Idc flows is the same as in the case where the dead time is not provided. As a result, the compensation for the dead time in the case where the dead time is provided removes a distortion of an input current which results from the dead time, and further, does not hinder the method of removing a distortion of an input current which results from the zero voltage vector.

Next, the dead time in a case where the load current is negative will be discussed with reference to FIG. 4. The load current flowing during the dead time in this case flows through the freewheeling diode of the upper arm, and thus the output terminal Pu is connected to the DC power supply line LH. Therefore, the periods in which the output voltage Vu takes the potentials Vmax and Vmid become longer by the dead time period.

In order to secure the dead time while compensating for the output voltage error as described above, the command Sup**, which rises with a delay from rising of the command Sup* by a sum of the dead time Td and the period Td' equal thereto and falls with falling of the command Sup', is employed. In addition, the command Sun**, which falls with a delay from the timing of falling of the command Sun* by the period Td' for compensating for an output voltage error and rises with a delay from rising of the command Sun* by the dead time Td for ensuring the dead time, is employed. The commands Sup and Sun control conduction/non-conduction of the switching devices Sup and Sun, respectively.

Koji Kato and Jun-ichi Itoh, "Improvement of Waveform for a Boost type AC/DC/AC Direct Converter Focused on Input Current" Year 2007 IEEJ Industry Applied Section Meeting 1-31, pp. 279-282 suggests the above-mentioned compensation for a dead time Td as well, which is effective also in the present embodiment. A to the period in which the potential Vmid of the middle phase is taken, the end timing is delayed by providing the dead time Td to its end timing. However, the load current is caused to flow through the lower arm and the output terminal Pu is connected to the DC power supply line LL by delaying the conduction period of the switch device Sun, with the result that the period in which the voltage Vu takes the potential Vmid of the middle phase is delayed by the same period as the dead time. Therefore, the length of the period in which the potential Vu takes the potential Vmid of the middle phase is compensated. The same holds true for the periods in which the potential Vu takes the potential Vmax of the maximum phase and the potential Vmin of the minimum phase.

As a result, the period in which the current Idc flows is compensated as well, which reduces a distortion of an input current and does not hinder the method of removing a distortion of an input current which results from the zero voltage vector.

The periods in which the voltage vectors V0 and V4 are employed fluctuate because of the presence of the dead time Td and, in FIG. 3 and FIG. 4, these periods are indicated by the reference symbols V0' and V4', respectively. In FIG. 3, one period V4' is lost in the period Tr, which results from the fact that (T/2)·drt·d4 is accidentally equal to the dead time Td in the figure. Therefore, it does not mean that one period V4' is inevitably lost. One period V4' is lost in each of the periods Tr and Ts in FIG. 4 as well, which incidentally occurs in the figure. Therefore, it does not mean that one period V4' is inevitably lost.

Second Embodiment

FIG. 5 and FIG. 6 are timing charts showing switching operations in a second embodiment of the present embodiment. The present embodiment is simply different from the first embodiment in the technique of compensating for the dead time. Thus, description on the removal of a distortion of an input current which results from the zero voltage vector will be omitted.

In the present embodiment, setting of a dead time and compensation therefor are achieved by correcting a command value of the carrier C2 employed in the inverter.

As in the first embodiment, first, a dead time in a case where the load current flows from the output terminal Pu (case where the load current is positive) will be considered with reference to FIG. 5. As described in the first embodiment, in this case, the output terminal Pu is connected to the DC power supply line LL at the dead time, and thus compensation for extending the period in which the potential Vu takes the potential Vmid of the middle phase or the potential Vmax of the maximum phase by the period of the dead time is required compared with the case where the dead time is simply provided.

In this case, in the present embodiment, the value drt+dst·d0 which is employed as a command value in the first embodiment is made to be a reference value, and a value drt+dst·d0−δ which is smaller than the reference value by a predetermined correction value δ is made to be a first command value. In addition, the value drt(1−d0) employed as a command value in the first embodiment is made to be a reference value, and a value drt(1−d0)+δ which is larger than the reference value by the correction value δ is employed as a second command value. Here, as in the carrier C1, the minimum value and the maximum value of the carrier C2 are 0 and 1, respectively, and thus an absolute value of a slope of a triangular wave is 2/T. Therefore, compared with the first embodiment, the period in which the command Sup* takes "1" (that is, the command Sun* takes "0") in a case where the dead time is not taken into consideration starts earlier by Δ=δ·T/2>0 and ends later by Δ.

The commands Sup and Sun whose rising is delayed from the commands Sup* and Sun* are generated for providing the dead time Td. Accordingly, the timing at which the command Sup rises is delayed by (Td−Δ) compared with the case where the inverter performs switching at timings at which the carrier C2 takes the command value drt+dst·d0 or the command value drt(1−d0). In addition, the timing at which the command Sup falls is delayed by Δ compared with the case where the inverter performs switching at the timings at which the carrier C2 takes the command value drt+dst·d0 or the command value drt(1−d0). Therefore, selection is made such that (Td−Δ)=Δ, that is, Δ=Td/2 (that is, δ=Td/T), whereby a length of a period in which the switch Sup is in conduction (period in which the current Idc flows) is made to be equal to a length of a period in which the carrier C2 takes the command value drt+dst·d0 or more or the command value drt(1−d0) or less. Accordingly, irrespective of the presence of the dead time, the length of the period in which the potential Vu takes the potential Vmid of the middle phase is also made to be equal to the length of the period in which the carrier C2 takes the command value drt+dst·d0 or more. Similarly, the length of the period in which the potential Vu takes the potential Vmax of the maximum phase is also made to be equal to the length of the period in which the carrier C2 takes the command value drt(1−d0) or less.

Next, the dead time in a case where the load current flows in from the output terminal Pu (case where the load current is negative) will be discussed with reference to FIG. 6. As described in the first embodiment, in this case, the output terminal Pu is connected to the DC power supply line LH at the dead time. For this reason, compensation for reducing the period in which the potential Vu takes the potential Vmid of the middle phase or the potential Vmax of the maximum phase by a period of the dead time is required compared with the case where the dead time is simply provided.

In the present embodiment, also in this case, the value $drt+dst\cdot d0-\delta$ which is smaller than the reference value $drt+dst\cdot d0$ by the predetermined correction value $\delta$ is employed as the first command value, and the value $drt(1-d0)+\delta$ which is larger than the reference value $drt(1-d0)$ by the correction value $\delta$ is employed as the second command value. It should be noted that, an absolute value of the correction value is Td/T as in the case where the load current is positive but takes a negative value ($\delta=-Td/T<0$).

As a result, the timing at which the command Sun falls is delayed by $\Delta$ compared with the case where the inverter performs switching at the timings at which the carrier C2 takes the command value $drt+dst\cdot d0$ and the command value $drt(1-d0)$. In addition, the timing at which the command Sun rises is delayed by $(Td-\Delta)$ compared with the case where the inverter performs switching at the timings at which the carrier C2 takes the command value $drt+dst\cdot d0$ and the command value $drt(1-d0)$. Therefore, selection is made such that $\Delta=Td/2$, whereby the length of the period in which the switch Sun is in non-conduction (length of the period in which the current Idc flows) is made to be equal to the length of the period in which the carrier C2 takes the command value $drt+dst\cdot d0$ or more or the command value $drt(1-d0)$ or less.

As described above, in the second embodiment, the command value in the case where the dead time is not taken into consideration is made to be a reference value, and a correction value is added to or subtracting from the reference value. This requires no complicated arithmetic processing, and an output voltage error resulting from the dead time is removed while providing the dead time, which makes it possible to remove distortions of an input current which result from the dead time as well as the zero voltage vector.

The periods in which the voltage vectors V0 and V4 are taken fluctuate due to the presence of the dead time Td, and in the figure, those periods are shown by the symbols V0' and V4', respectively. The period V4' is not inevitably lost as described in the first embodiment.

In a switching mode of the inverter 2 in the present embodiment, the dead time in the case where the direction in which the load current flows from the output terminal Pu is positive and the load current is positive will be discussed with the zero voltage vector V0' in which the presence of the dead time is taken into consideration. Description may be given in such a manner that the zero voltage vector V0' is employed in a period in which the carrier C2 takes the command value $drt(1-d0)+\delta$ to the command value $drt+dst\cdot d0-\delta$. If a sign and an absolute value of the correction value $\delta$ are selected as described above, the dead time is compensated.

Third Embodiment

FIG. 7 and FIG. 8 are timing charts showing switching operations in a third embodiment of the present embodiment. The present embodiment is simply different from the second embodiment in that a waveform of the carrier is a sawtooth wave. The present embodiment is similar to the second embodiment in that an influence of the dead time is compensated by correcting a command value of an inverter, but is different therefrom in that a waveform of a carrier is a sawtooth wave.

A carrier C3 used in commutation of the converter 1 is the same as a carrier C4 used in switching of the inverter 2. In FIG. 7 and FIG. 8, the carrier C4 is shown by being enlarged more in a longitudinal axis direction compared with the carrier C3 for specifically indicating a command value of the inverter 2, and both show the minimum value as 0 and the maximum value as 1.

Also in the present embodiment, exclusive conduction of the switch devices Srp and Ssp in the state where the switch device Stn is in conduction is taken into consideration, and thus a command value is set based on duties at which the switch devices Srp and Ssp are brought into conduction. The carrier C3 has the slope linear with respect to time, and if the switch device Srp is brought into conduction in a case where the carrier C3 takes a value 0 to drt, and if the switch Ssp is brought into conduction in a case where the carrier C3 takes the value drt to 1, the conduction periods thereof correspond to the duties. Accordingly, also in the third embodiment, the value drt is employed as a command value of the carrier C3 as in the carrier C1 used in the first and second embodiments.

Through employment of the switching as described above, one cycle T of the carrier C3 is divided into a period Ts in which the carrier C3 takes the value drt or more and a period Tr in which the carrier C3 takes the value drt or less, which are calculated by $ds\cdot T$ and $drt\cdot T$, respectively.

The converter undergoes commutation when the slope of the carrier C3 is constant before and after the commutation of the converter 1 or the carrier C3 takes transition between the minimum value and the maximum value.

In addition, also in the present embodiment, the value drt is set as a reference value and a command value of the carrier C4 in a case where the dead time is not taken into consideration is provided on each of the side with the reference value or more and the side with the reference value or less.

It should be noted that the carrier C3 employs a sawtooth wave, and thus a technique of employing a zero voltage vector in the switching mode of the inverter 2 is different from those of the first and second embodiments. The period in which the carrier C2 shows the negative slope with respect to time, which is shown in FIG. 3, is equivalent to the period in which the carrier C4 slopes. In the carrier C2, the inverter 2 takes the voltage vector V6 (110) at both ends of this period.

Therefore, in the present embodiment, it is required not only to employ the zero voltage vector V0 (000) sandwiched between a pair of voltage vectors V4 (100) as in the first and second embodiments, but also to employ the zero voltage vector V7 (111) sandwiched between a pair of voltage vectors V6 (110). This is because in a case where different voltage vectors are provided in adjacent periods, the transition between two voltage vectors is normally executed only by switching of one arm.

Accordingly, in the present embodiment, command values of the carrier C4 in a case where the dead time is not taken into consideration are first set to be reference values, and are provided on the side having a value larger than the reference value drt and on the side having a value smaller than the reference value drt as follows. Specifically, there are set reference values $(drt+dst\cdot d0)$ and $(drt+dst(d0+d4+d6))$ for internally dividing, in the carrier C4, an interval from the reference value drt to the maximum value (=1) at a ratio among d0, (d4+d6) and d7(=1−d0−d4−d6) in this order. In addition, there are set reference values $drt(1-d0)$ and $drt(1-d0-d4-d6)$ for internally dividing an interval from the reference value drt to the minimum value (=0) at the ratio among d0, (d4+d6) and d7 in this order.

Accordingly, as in the first embodiment, the periods in each of which the zero voltage vector V0 is employed are $T\cdot dst\cdot d0$ and $T\cdot drt\cdot d0$ in the periods Ts and Tr, respectively, and are divided proportionally at a ratio between the values dst and drt. In a similar manner to this, the periods in each of which the zero voltage vector V7 is employed are $T\cdot dst\cdot d7$ and T·drt·d7 in the periods Ts and Tr, respectively, and are divided proportionally at the ratio between the values dst and drt. The ratio between the periods Ts and Tr is also equal to the ratio between the values dst and drt. Therefore, the aforementioned reference values (drt+dst·d0), (drt+dst(d0+d4+d6)), drt(1−d0) and drt(1−d0−d4−d6) are employed as command values, whereby the period in which the current does not flow is generated in proportion to the length of the periods Ts and Tr in each of those periods, and a distortion of an input current which results from the zero voltage vector is removed.

Note that the output terminal Pu is kept in conduction with the DC power supply line LH in the voltage vectors V4 and V6 employed by the inverter 2, other than the zero voltage vectors V0 and V7. In addition, the output terminal Pw is kept in conduction with the DC power supply line LL in the voltage vectors V4 and V6 employed by the inverter 2, other than the zero voltage vectors V0 and V7.

In a case where the dead time is taken into consideration, the correction amount δ needs to be added to or subtracted from the reference values (drt+dst·d0), (drt+dst(d0+d4+d6)), drt(1−d0) and drt(1−d0−d4−d6). Moreover, there are two types of zero voltage vectors V0 and V7, and hence an output voltage error is determined in accordance with energization states of two phases.

FIG. 7 shows the case where the load current flowing to the output terminal Pu of the u-phase is positive and the load current flowing to the output terminal Pw of the w-phase is negative. In this case, the commands Sup and Sun should be made in a similar manner to an area in which the slope of the carrier C2 of FIG. 5 is negative. Therefore, a correction amount δ is made to be positive, and is added to and subtracted from the reference values (drt+dst·d0) and drt(1−d0), to thereby obtain command values (drt+dst·d0)−δ and drt(1−d0)+δ. In addition, the commands Swp and Swn should be made in a similar manner to an area in which the slope of the carrier C2 of FIG. 6 is negative. Therefore, a correction amount δ is made to be negative, and is added to and subtracted from the reference values (drt+dst(d0+d4+d6)) and drt(1−d0−d4−d6), to thereby obtain command values (drt+dst(d0+d4+d6))−δ and drt(1−d0−d4−d6)+δ.

FIG. 8 shows the case where the load current flowing to the output terminal Pu of the u-phase is negative and the load current flowing to the output terminal Pw of the w-phase is positive. In this case, the commands Sup and Sun should be made in a similar manner to an area in which the slope of the carrier C2 of FIG. 5 is positive. Therefore, a correction amount δ is made to be negative, and is added to and subtracted from the reference values (drt+dst·d0) and drt(1−d0), to thereby obtain command values (drt+dst·d0)−δ and drt(1−d0)+δ. In addition, the commands Swp and Swn should be made in a similar manner to an area in which the slope of the carrier C2 of FIG. 6 is positive. Therefore, a correction amount δ is made to be positive, and is added to and subtracted from the reference values (drt+dst(d0+d4+d6)) and drt(1−d0−d4−d6), to thereby obtain command values (drt+dst(d0+d4+d6))−δ and drt(1−d0−d4−d6)+δ.

Also in the present embodiment, Δ=Td/2 for compensating for the dead time Td. Although the absolute value of the slope of the carrier C2 is 2/T, an absolute value of the slope of the carrier C4 is 1/T, and thus Δ=δ·T. Therefore, an absolute value of the correction value δ is Td/2T.

Periods in which the voltage vectors V0, V4, V6 and V7 are taken fluctuate due to the presence of the dead time Td, and those periods are indicated by symbols V0', V4', V6' and V7', respectively. The zero voltage vectors V0' and V7' in which the presence of the dead time is taken into consideration are used, and thus the switching mode of the inverter 2 in the present embodiment is described as follows. In the period in which the carrier C4 takes the command value drt(1−d0)+δ to (drt+dst·d0)−δ, the zero voltage vector V0 is employed. In the period in which the carrier C4 takes the command value (drt+dst(d0+d4+d6))−δ or more or the command value drt(1−d0−d4−d6)+δ or less, the zero voltage vector V7 is employed. Then, the symbols and the absolute value of the correction value δ are selected as described above, and hence the dead time is compensated.

As described above, also in the third embodiment as in the second embodiment, the command value in the case where the dead time is not taken into consideration is set to be a reference value, and a correction value is added to and subtracted from the reference value. This requires no complicated arithmetic processing, and an output voltage error resulting from the dead time is removed while providing the dead time, which makes it possible to remove distortions of an input current which result from the dead time as well as the zero voltage vector.

Fourth Embodiment

In the present embodiment, description will be given of an example of a method in which a timing of commutation of the converter 1 is determined to set a value serving as a reference of a command value in switching of the inverter 2.

In a voltage-source inverter, except in a case where a zero voltage vector is employed, switching devices on a high arm side are brought into conduction for one phase, switching devices on a low arm side are brought into conduction for the other phase, and switch devices on the high arm side and switch devices on the low arm side are alternately brought into conduction for a remaining phase (except for dead time).

Accordingly, in a waveform of a voltage command in the voltage-source inverter, a voltage command of any one of phases always takes the maximum value of a carrier, whereas a voltage command of the other phase always takes the minimum value of the carrier. Then, a voltage command of the remaining one phase takes a value between the minimum value and the maximum value of the carrier, which is considered to be a middle phase between the other two phases.

FIG. 9 is a graph showing such voltage commands Va*, Vb* and Vc* as examples. The voltage commands Va*, Vb* and Vc* each have 360-degree cycles, are shifted from each other by 120°, and show a trapezoidal wave having a pair of flat sections which continue for 120° and a pair of slope areas for 60° for linking the pair of flat sections. Here, there is shown a case, as an example, where values −1 and 1 are employed as the minimum values and the maximum values of the voltage commands Va*, Vb* and Vc*. Considering that in FIG. 9, for example, the voltage command Vb* is the middle phase at phase angle of 0° to 60°, and the voltage commands Va* and Vc* take the values 1 and −1, respectively, in this case, it is revealed that the voltage command Vb* internally divides an interval from −1 to 1 at (1+Vb*) and (1−Vb*).

On the other hand, as described in the first embodiment, the carrier C2 is compared with the command value of the inverter 2, and the inverter 2 is a voltage-source one. Accordingly, in order to generate a command value for repeating the voltage vectors V0, V4, V6 and V4 in this order, there are required output voltage command signals Vu*, Vv* and Vw* which take the values d0, d0+d4 and d0+d4+d6=1 and the reference value drt (value dst is obtained from 1−drt).

Accordingly, waveforms indicated by the trapezoidal wave voltage commands Va*, Vb* and Vc* are used as voltage commands Vr*, Vs* and Vt* of the r-phase, s-phase and t-phase, respectively, and a middle phase thereamong is detected. The minimum values and maximum values of the carriers C1 and C2 are each set to be 0 and 1, and thus a value of the middle phase is multiplied by ½ and ½ is added thereto, which is used as the reference value (value drt shown in FIG. 3) of the inverter 2. Specifically, the period in which the carrier C2 has the reference value or more and the period in which the carrier C2 has the reference value or less are internally divided by a value corresponding to the voltage vector.

A timing at which the carrier C1 takes the value of the middle phase is set as a timing of commutation of the converter 1. As a result, it is possible to use the same waveform in the carrier C1 for PWM control of the converter 1 and the carrier C2 for PWM control of the inverter 2, as described in the embodiment above. Hereinafter, description will be given of commutation of the converter 1 at the timing at which the carrier C1 takes the value of the middle phase of the voltage commands Vr*, Vs* and Vt* while employing the voltage commands Vr*, Vs* and Vt* for comparison targets with the carrier C1.

FIG. 10 is a block diagram showing a control circuit 3 for obtaining the switch commands Srp*, Ssp*, Stp*, Sm*, Ssn*, Stn*, Sup, Svp, Swp, Sun, Svn and Swn. The switch commands Srp*, Ssp*, Stp*, Sm*, Ssn* and Stn* respectively instruct conduction/non-conduction of the switch devices Srp, Ssp, Stp, Sm, Ssn and Stn, and the switch commands Sup, Svp, Swp, Sun, Svn and Swn respectively instruct conduction/non-conduction of the inverter 2 in which the dead time is taken into consideration.

A part which controls the converter 1 (hereinafter, "converter control unit") includes a trapezoidal-wave-shape voltage command signal generating unit 11, where trapezoidal-wave-shape voltage command signals Vr*, Vs* and Vt* to be compared with the carrier C1 are generated. A part which controls the inverter 2 (hereinafter, "inverter control unit") includes a trapezoidal-wave-shape voltage command signal generating unit 21, where trapezoidal-wave-shape voltage command signals Vu*, Vv* and Vw* to be compared with the carrier C2 are generated.

A middle phase detecting unit 14 detects a middle phase of the trapezoidal-wave-shape voltage command signals Vr*, Vs* and Vt*, to thereby obtain a difference between the maximum phase and the middle phase, a difference between the minimum phase and the middle phase, or to obtain the two differences and further a ratio therebetween. In this case, the maximum amplitudes of the trapezoidal-wave-shape voltage command signals Vr*, Vs* and Vt* are one, which are matched to the amplitude of the carrier C2, and FIG. 10 shows the operation according to FIG. 3. Accordingly, the value drt is obtained as $|Vr^*-Vt^*|$, and the value dst is obtained as $|Vs^*-Vt^*|$.

The inverter control unit includes an output voltage command signal generating unit 21 which generating the voltage commands Vu*, Vv* and Vw* which are command values of output voltage of the inverter 2. Here, the maximum amplitudes of the trapezoidal-wave-shape voltage command signals Vu*, Vv* and Vw* are matched to the amplitude of the carrier C2 to be set to one. Needless to say, the amplitudes of the carriers C1 and C2 are not necessarily required to be one, and the maximum amplitudes of the trapezoidal-wave-shape voltage command signals Vr*, Vs*, Vt*, Vu*, Vv* and Vw* are determined in proportion to the amplitudes thereof.

The inverter control unit includes a first correcting unit 22 and a second correcting unit 23 each of which corrects the voltage commands Vu*, Vv* and Vw* by values obtained from the middle phase of the trapezoidal-wave-shape voltage command signals Vr*, Vs* and Vt* for converter control.

An output of the first correcting unit 22 indicates command values in an area in which the carrier C2 takes the value drt or more (that is, area of the carrier C2 in the period Ts because the carrier C1 and the carrier C2 are the same), and an output of the second correcting unit 23 indicates command values in an area in which the carrier C2 takes the value drt or less (that is, area of the carrier C2 in the period Tr because the carrier C1 and the carrier C2 are the same).

Specifically, taking the case of FIG. 3 as an example, the switch device Swn is in conduction and the switch device Swp is in non-conduction in the inverter 2, and thus the voltage commands Vu*, Vv* and Vw* are d0, d0+t4 and 1, respectively. Therefore, in order to obtain command values drt+dst·d0, drt+dst(d0+d4) and drt+dst(=1) for the carrier C2 in the period Ts, each of the voltage commands Vu*, Vv* and Vw* may be multiplied by the value dst to further obtain a sum with the value drt. The above is indicated by "drt+dst·V*" in FIG. 10. Here, the symbol V* represents the voltage commands Vu*, Vv* and Vw*. Needless to say, a command value may be obtained as drt(1−V*)+V* considering that dst=1−drt.

Similarly, in order to obtain the command values drt(1−d0), drt(1−d0−d4) and drt(1−d0−d4−d6)(=0) for the carrier C2 in the period Tr, each of the voltage commands Vu*, Vv* and Vw* may be subtracted from one, and the resultant may be further multiplied with the value drt. The above is indicated by "drt(1−V*)" in FIG. 10.

Six command values obtained as described above are compared with the carrier C2 by a comparing unit 24. The switch devices Sup, Svp, Swp, Sun, Svn and Swn perform switching for forming the voltage vectors V0, V4, V6 and V4 in each of the periods Tr and Ts. For example, as to the u-phase, the switch devices Sup and Sun perform switching in each of the periods Tr and Ts. Accordingly, a logical sum is obtained for each phase in the comparison results, to thereby obtain the switch commands Sup, Svp, Swp, Sun, Svn and Swn. This logical sum operation is performed by a logical sum operation unit 25.

The converter control unit includes a comparing unit 12, where the trapezoidal-wave-shape voltage command signals Vr*, Vs* and Vt* are compared with the carrier C1. The relationship between those comparison results and the switch commands Srp*, Ss*, St*, Srn*, Ssn* and St* will be described below.

Takaharu Takeshita, Koji Toyama and Nobuyuki Matsui, "PWM Scheme for Current Source Three-Phase Inverters and Converters", IEEJ Transactions on Industry Applications, Vol. 116, No. 1, 1996, pp. 106-107 above suggests, considering duality between phase voltage of a voltage-source inverter and phase current of a current-source inverter and duality between line voltage of the voltage-source inverter and line current of the current-source inverter, a correspondence relationship between switching based on a line current command value and switching based on phase current command value.

FIG. 11 is a circuit diagram showing a configuration of an inverter discussed here. The inverter is shown for discussing switching of the converter 1 and does not directly relate to the inverter 2, and designations, a-phase, b-phase and c-phase, are employed for a three-phase AC. The inverter includes a switch device Sap and a switch device San on a high arm side and on a low arm side of the a-phase, respectively. In a similar manner, the inverter includes switch devices Sbp and Sbn in the b-phase and switch devices Scp and Scn in the c-phase.

A line current is of the a-phase is obtained from a difference between a phase current ica between the a-phase and c-phase and a phase current iba between the b-phase and a-phase, and accordingly an a-phase current flows only in a case where switching for causing a pair of these phase currents to flow. The same holds true for line currents of other phases. Therefore, a symbol Sjk indicates whether or not a phase current ijk flows through the switch devices on the upper arm side, and a symbol SjkB indicates whether or not the phase current ijk flows through the switch devices on the lower arm side. Here, symbols j and k represent symbols a, b and c though different from each other, and whether the phase current ijk "flows"/"does not flow" is indicated by a binary logic "1"/"0" taken by the symbols Sjk and SjkB.

When the inverter causes the line current to flow based on a comparison between the phase voltage command and the carrier, switch commands for controlling conduction/non-conduction of a switch device Sjp on a high arm side and a switch device Sjn on a low arm side are represented by symbols $Sj^+$ and SI, respectively, the description in Takaharu Takeshita, Koji Toyama and Nobuyuki Matsui, "PWM Scheme for Current Source Three-Phase Inverters and Converters", IEEJ Transactions on Industry Applications, Vol. 116, No. 1, 1996, pp. 106-107 is as follows.

[Equation 7]

$$Sa^+=Sac\cdot SbaB, Sb^+=Sba\cdot ScbB, Sc^+=Scb\cdot SacB,$$

$$Sa^-=Sba\cdot SacB, Sb^-=Scb\cdot SbaB, Sc^-=Sac\cdot ScbB \quad (7)$$

Here, further considering duality between the phase voltage of the voltage-source inverter and the phase current of the current-source inverter, it is revealed that logic values of right sides of the respective equations above are obtained as comparison results between the phase voltage of the voltage-source inverter and the carrier. According to Takaharu Takeshita, Koji Toyama and Nobuyuki Matsui, "PWM Scheme for Current Source Three-Phase Inverters and Converters", IEEJ Transactions on Industry Applications, Vol. 116, No. 1, 1996, pp. 106-107, a command value of the phase current ijk corresponds to a command value of a phase voltage Vj. Therefore, the logic of the symbol Sjk matches the logic for bringing the switch device Sjp into conduction by the comparison between a phase voltage command Vj* and the carrier, and the logic of the symbol SjkB matches the logic for bringing the switch device Sjn into conduction by the comparison between the phase voltage command Vj* and the carrier.

Description is now given of a case where a phase angle is from 0° to 60° in the voltage commands Va*, Vb* and Vc* shown in FIG. 9. The voltage commands Va* and Vc* take values 1 and −1, respectively, and thus Sac=1, SacB=0 and ScbB=1. As a result, $Sa^+=SbaB$, $Sb^+=Sba$, and $Sc^+=Sa^-=Sb^-=0$.

The logic of the symbol SbaB matches the logic for respectively bringing the switch devices Sap and Sbp into conduction/non-conduction by the comparison between the phase voltage command Vb and the carrier, and the logic of the symbol Sba matches the logic for respectively bringing the switch devices Sbp and Sap into conduction/non-conduction by the comparison between the phase voltage command Vb and the carrier. More specifically, the switch device Sap is brought into conduction in a case where the phase voltage command Vb is equal to or less than the carrier, and the switch device Sbp is brought into conduction in the above-mentioned case. The symbols $Sa^+$ and $Sb^+$ indicate a period for bringing the switch devices Sap and Sbp into conduction, respectively, when the line current is caused to flow.

To put it in the context of the present invention, the a-phase, b-phase and c-phase are replaced with the r-phase, s-phase and t-phase, respectively. Here, the switch device Srp is brought into conduction in a case where the voltage command signal Vs* is equal to or smaller than the carrier C1, and the switch device Ssp is brought into conduction in a case where the voltage command signal Vs* is equal to or larger than the carrier C1. Considering that the minimum value of the carrier C1 is 0, a value of the voltage command signal Vs* is equivalent to a period for bringing the switch device Srp into conduction.

From the above, the value of the voltage command signal Vs* is the reference value drt in a case of obtaining a command value of the carrier C2. In addition, it defines the timing of commutation, at which the switch devices Srp and Ssp of the converter 1 are alternately brought into conduction in periods proportional to a ratio between the values drt and 1-drt, as a value of the carrier C1. The description above holds true for the voltage commands Vr* and Vt* also at other phase angle.

The results obtained through comparison between the carrier C1 and the voltage command signals Vr*, Vs* and Vt* determined as described above are supplied to a current-source gate logic converting unit 13 from the comparing unit 12, and conversion in accordance with a conversion equation shown by Equation (7) is performed thereon.

Through the conversion, the switch commands Srp*, Ssp*, Stp*, Srn*, Ssn* and Stn* are obtained.

Fifth Embodiment

The present embodiment describes an example of desirable waveforms of the voltage command signals Vr*, Vs* and Vt* described in the fourth embodiment.

As described above, the voltage commands Va*, Vb* and Vc* shown in FIG. 9 as an example are employed as the voltage command signals Vr*, Vs* and Vt* in the fourth embodiment (in a case where the minimum values and maximum values of the carriers C1 and C2 are set to 0 and 1, respectively, the voltage commands Va*, Vb* and Vc* are multiplied by ½, to which ½ is added). In addition, waveforms thereof have each 360-degree cycles, are shifted from each other by 120°, and are trapezoidal waves having a pair of flat sections which continue for 120° and a pair of slope areas for 60° for linking the pair of flat sections. Hereinafter, description will be given of a desirable function form of a waveform in a slope area of a section for 60°.

Lixiang Wei and Thomas A. Lipo, "A Novel Matrix Converter Topology with Simple Commutation", IEEE IAS 2001, vol. 3, 2001, pp. 1749-1754 above describes a desirable relationship of a ratio for bringing switch devices, which are described as the switch devices Srp and Ssp in the present invention, into conduction, that is, a current conduction ratio. In the present embodiment, the desirable current conduction ratio described in Lixiang Wei and Thomas A. Lipo, "A Novel Matrix Converter Topology with Simple Commutation", IEEE IAS 2001, vol. 3, 2001, pp. 1749-1754 will be first described. Then, description will be given of slope areas of the voltage command signals Vr*, Vs* and Vt* for achieving such a current conduction ratio.

FIG. 12 is a graph showing, as an example, phase voltages Vr, Vs and Vt input to the input terminals Pr, Ps and Pt of the converter 1, respectively, current conduction ratios (duties) of respective phases, a voltage between the DC power supply lines LH and LL, and input currents Ir, Is and It. Each of the phase voltages Vr, Vs and Vt is divided into any of an area 1 in which two phase voltages are positive and the remaining one phase voltage is negative and an area 2 in which two phase voltages are negative and the remaining one phase voltage is positive. Those areas 1 and 2 appear alternately for each 60-degree phase angle. Specifically, the phase voltages Vr, Vs and Vt are based on the following equation.

[Equation 8]

$$Vr=Vm\cdot\cos(\theta),$$

$$Vs=Vm\cdot\cos(\theta-2\pi/3),$$

$$Vt=Vm\cdot\cos(\theta+2\pi/3),$$

$$Vm=1/\sqrt{3} \quad (8)$$

As one switching mode of the converter, in each of the areas 1 and 2, the switch devices are always brought into conduction in a phase (maximum phase or minimum phase) in which an absolute value of the phase voltage is the largest, whereas the switch devices are brought into conduction at a predetermined current conduction ratio in two phases (whose polarities are opposite to the maximum phase or minimum phase) other than this.

The duties of the switch devices Srp, Ssp and Stp are shown in the case where the current conduction ratio is positive, while the duties of the switch devices Srn, Ssn and Stn are shown in the case where the current conduction ratio is negative. As described above as an example, the switch devices connected to the DC power supply line LL are always brought into conduction in the phase corresponding to the minimum phase, and thus the current conduction ratio is −1. The switch devices connected to the DC power supply line LH are always brought into conduction in the phase corresponding to the maximum phase, and thus the current conduction ratio is 1.

For example, an area whose phase angle is from 30° to 90° is classified into the area 1. The t-phase is the minimum phase, an absolute value of the phase voltage is the largest, and a polarity thereof is negative in this area, whereby the switch device Stn is always brought into conduction. Polarities of phase voltages are positive in the r-phase and s-phase other than the phase above, and thus the switch devices Srp and Ssp are brought into conduction at the following current conduction ratios drt and dst, respectively, in an exclusive manner.

[Equation 9]

$$drt=|\cos\theta r/\cos\theta t|, dst=|\cos\theta s/\cos\theta t| \quad (9)$$

Note that θr, θs and θt are phases of the phase voltages Vr, Vs and Vt, respectively, and accordingly have relationships of $\theta s=\theta r-2\pi/3$ and $\theta ts=\theta r+2\pi/3$.

An area whose phase angle is from 90° to 150° is classified into the area 2. In this area, the s-phase is the maximum phase, an absolute value thereof is the largest, and a polarity thereof is positive, whereby the switch device Ssp is always brought into conduction. In the r-phase and t-phase other than the phase above, polarities of the phase voltages are negative, and thus the switch devices Srn and Stn are brought into conduction at the following current conduction ratios, respectively, in an exclusive manner (current conduction ratio which is negative in FIG. 12 indicates that the polarity of the phase voltage is negative).

[Equation 10]

$$dts=|\cos\theta t/\cos\theta s|, drs=|\cos\theta r/\cos\theta s| \quad (10)$$

Note that Table 1 shows, in areas for each 60-degree phase angle, the switch device which is always brought into conduction and the switch devices which are brought into conduction through switching in an exclusive manner.

TABLE 1

| | Phase angle | | | | | | |
|---|---|---|---|---|---|---|---|
| | 0 to 30 | 30 to 90 | 90 to 150 | 150 to 210 | 210 to 270 | 270 to 330 | 330 to 360 |
| Conduction all the time | Srp | Stn | Ssp | Srn | Stp | Ssn | Srp |
| Conduction/Non-conduction | Ssn, Stn | Srp, Ssp | Srn, Stn | Ssp, Stp | Srn, Ssn | Srp, Stp | Ssn, Stn |

The switch device corresponding to the maximum phase or the minimum phase is always in conduction, and thus as the voltage (hereinafter, referred to as "DC link voltage") applied between the DC power supply lines LH and LL, two voltages of a line voltage Emax between the maximum phase and the minimum phase and a line voltage Emid between the minimum phase and the middle phase (area 1) or between the maximum phase and the middle phase (area 2) are obtained. An average value Vdc of the DC link voltage is obtained by multiplying current conduction ratios thereof, which is represented as follows, and the DC link voltage has a pulsating-current-shaped voltage waveform through switching at the above-mentioned current conduction ratio.

[Equation 11]

$$Vdc=3Vm/(2\cos\theta in),$$

$$\cos\theta in=\max(|\cos\theta r|,|\cos\theta s|,|\cos\theta t|) \quad (11)$$

On the inverter 2 side, this voltage Vdc is used as an input for control. Voltage control is performed so as to compensate for a pulsating current amount on the inverter 2 side, and thus an energization time is multiplied by the pulsating current component cos θin. A load of the inverter 2 is inductive, and accordingly is regarded as a current source. Therefore, a current idc_avg flowing through the DC power supply lines LH and LL is represented by $k\cdot I0\cdot\cos\psi\cdot\cos\theta in$ where I0 represents an amplitude of an output current of the inverter 2. Note that k represents a modulation factor and $0<k<\sqrt{3}/2$, and ψ represents a phase difference between an output voltage and the output current.

One phase is in a conduction state and two phases are switched at respective current conduction ratios on the converter 1 side, and thus, for example, in the area whose phase angle is from 30° to 90°, the input currents ir, is and it of the respective phases are represented as follows.

[Equation 12]

$$ir=drt\cdot idc\_avg=k\cdot I0\cdot\cos\psi\cdot\cos\theta r$$

$$is=dst\cdot idc\_avg=k\cdot I0\cdot\cos\psi\cdot\cos\theta s$$

$$it=-idc\_avg=k\cdot I0\cdot\cos\psi\cdot\cos\theta t \quad (12)$$

Similar results are obtained also at other phase angle, and thus the input currents ir, is and it are made to have sine waves as shown in FIG. 3.

As to the current conduction ratio, absolute values of the waveforms in the slope areas are represented in common with respect to the slope areas of the respective phases when a phase angle ø ($0\leqq ø\leqq\pi/3$) is individually introduced in each of the areas 1 and 2, from symmetry of the phase voltages Vr, Vs and Vt. Here, the waveform of the slope area is derived with the area 1 of $30\leqq\theta\leqq 90$ being a target for discussion. A relationship $ø=\theta-\pi/6$ is established in this area, and thus in a slope area in which a current conduction ratio increases along with an increase in phase angle ø, a current conduction ratio thereof is represented as follows.

[Equation 13]

$$\sin\phi/\sin(\phi+\pi/3) = \left(\sqrt{3}\cdot\sin(\phi-\pi/6)/\sin(\phi+\pi/3)+1\right)/2 = \left(1+\sqrt{3}\tan(\phi-\pi/6)\right)/2 \quad (13)$$

In a similar manner, in a slope area in which a current conduction ratio decreases along with an increase in phase angle θ, a current conduction ratio thereof is represented by $(1-\sqrt{3}\tan(\varnothing-\pi/6))/2$.

Accordingly, the slope areas of the voltage command signals Vr*, Vs* and Vt* are represented with the above-mentioned current ratios by introducing the phase angle θ with its start being a reference. For example, when the b-phase is replaced with the s-phase with reference to FIG. 9, the voltage command signal Vs* is represented as follows.

[Equation 14]

$$\begin{aligned} Vs^* &= \left(1+\sqrt{3}\tan(\phi-\pi/6)\right)/2 && (0 \le \phi \le \pi/3) \\ &= 1 && (\pi/3 \le \theta \le \pi) \\ &= \left(1-\sqrt{3}\tan(\phi-\pi/6)\right)/2 && (\pi \le \theta \le 4\pi \le 3) \\ &= 0 && (4\pi \le 3 \le \theta \le 2\pi) \end{aligned} \quad (14)$$

The same holds true for other phase. Needless to say, the above expression differs if an amplitude and a median of the carrier C1 differ. For example, if the minimum value and the maximum value of the carrier C1 are represented by m and M, respectively, the amplitude thereof is (M−m)/2 and the median thereof is (M+m)/2, whereby a trapezoidal wave is represented as follows.

[Equation 15]

$$\begin{aligned} Vs^* &= \left((m+M)+\sqrt{3}\cdot(M-m)\cdot\tan(\theta-\pi/6)\right)/2 && (0 \le \theta \le \pi/3) \\ &= m+M && (\pi/3 \le \theta \le \pi) \\ &= \left((m+M)-\sqrt{3}\cdot(M-m)\cdot\tan(\theta-\pi/6)\right)/2 && (\pi \le \theta \le 4\pi/3) \\ &= M-m && (4\pi/3 \le \theta \le 2\pi) \end{aligned} \quad (15)$$

For example, if the minimum value and the maximum value of the carrier C1 are −1 and 1, respectively, among the slope areas, the trapezoidal wave takes $\sqrt{3}\tan(\varnothing-\pi/6)$ in the area in which they increase along with an increase in phase angle, while the trapezoidal wave takes $-\sqrt{3}\tan(\varnothing-\pi/6)$ in the area in which they decrease along with an increase in phase angle.

Sixth Embodiment

In the present embodiment, simple operation for obtaining the voltage command signals Vr*, Vs* and Vt* described in the fifth embodiment will be described. In this case, the technique described in Japanese Patent Application Laid-Open No. 06-81514 is used, and a processing is further added, to thereby obtain the voltage commands Vr*, Vs* and Vt. Specifically, with reference to FIG. 10, the trapezoidal-wave-shape voltage command signal generating unit 11 receives a waveform Vr of the r-phase as a power supply synchronization signal. Based on this, a voltage waveform which is a source of the voltage command signal is obtained. Specifically, voltage waveforms of the respective phases are represented as follows (see phase voltages of FIG. 12).

[Equation 16]

$$Vr = Vm\cdot\cos\theta,$$

$$Vs = Vm\cdot\cos(\theta-2\pi/3),$$

$$Vt = Vm\cdot\cos(\theta+2\pi/3) \quad (16)$$

Next, ½ of the middle phase of those three phases is added to each thereof. For example, in a range where the phase angle is from 0° to 60°, the middle phase is the r-phase. Accordingly, new voltage waveforms Vr', Vs' and Vt' are obtained within this phase angle range as follows.

[Equation 17]

$$Vr' = \sqrt{3}/2\cdot Vm\cdot\sin(\theta+\pi/3),$$

$$Vs' = 3/2\cdot Vm\cdot\sin(\theta-\pi/6),$$

$$Vt' = \sqrt{3}/2\cdot Vm\cdot\sin(\theta+\pi/3) \quad (17)$$

Figure 13:
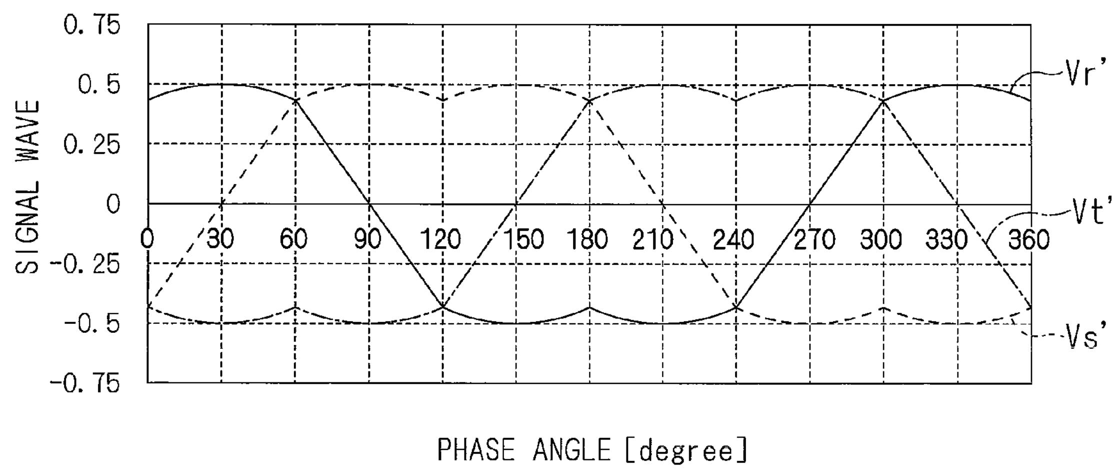
FIG. 13 is a graph showing a voltage waveform.

Here, Vr+Vs+Vt=0 is used. FIG. 13 is a graph showing the voltage waveforms Vr', Vs' and Vt', where $Vm=1/\sqrt{3}$.

An envelope on a high-potential side of the DC link voltage Vdc (hereinafter, referred to as pulsating voltage Vlink) is a voltage difference between the maximum phase and the minimum phase, and is the line voltage Vrt within a range where the phase angle is from 0° to 60°. Therefore, the following equation is established within this phase angle range.

[Equation 18]

$$V\text{link} = Vrt = Vt - Vr = \sqrt{3}\sin(\theta+\pi/3) \quad (18)$$

Accordingly, the following equation is obtained from Equations (17) and (18).

[Equation 19]

$$Vr' = V\text{link}/2,$$

$$Vs' = \sqrt{3}/2\cdot V\text{link}\cdot\cos(\theta-2\pi/3)/\sin(\theta+\pi/3),$$

$$Vt' = -V\text{link}/2 \quad (19)$$

A processing is added further. Specifically, the voltage waveforms Vr', Vs' and Vt' are normalized by the voltage waveform Vr'. As a result, voltage waveforms Vr", Vs" and Vt" described below are obtained.

[Equation 20]

$$Vr'' = Vr'/Vr' = 1$$

$$Vs'' = Vs'/Vr' = \sqrt{3}\cdot\cos(\theta-2\pi/3)/\sin(\theta+\pi/3)$$

$$Vt'' = Vt'/Vr' = -1 \quad (20)$$

Further, considering that the minimum value and the maximum value of the carrier C1 are 0 and 1, respectively, magnitudes of those waveforms are reduced in half, and the minimum value and the maximum value are set to 0 and 1, respectively. Specifically, the following operation is performed using the voltage waveforms Vs" and Vt".

[Equation 21]

$$\begin{aligned}(Vs''-Vt'')/2 &= \left(\sqrt{3}\cdot\cos(\theta-2\pi/3)/\sin(\theta+\pi/3)-(-1)\right)/2 \\ &= \left(1+\sqrt{3}\cdot\tan(\theta-\pi/6)\right)/2\end{aligned} \tag{21}$$

Equation (21) coincides with Equation (14) within the range of 0° to 60°. That is, it is revealed that the trapezoidal-wave-shape voltage command signal Vs* is obtained through the above-mentioned processing.

That is, the trapezoidal-wave-shape voltage command signal generating unit 11 obtains the power supply synchronization signal Vr to generate voltage waveforms of three phases, adds ½ of the middle phase thereof to the respective waveforms, and performs a processing for normalizing the result of addition by the maximum phase, to thereby obtain the trapezoidal-wave-shape voltage command signal Vs*. Those of other phases are obtained in a similar manner.

Seventh Embodiment

In the present embodiment, other setting for determining a timing of commutation of the converter 1 will be described. Specifically, description will be given of a case where a current value is employed as a command value of the carrier C1 of the current-source converter 1. In this case, the current conduction ratio itself may be employed as the current command value.

With reference to FIG. 12, the current conduction ratio drt of the r-phase and the current conduction ratio dst of the s-phase may be employed as command values of the carrier C1 in a section where the phase angle θ is from 30° to 90° (here, the current conduction ratio of the t-phase is indicated as −1 because switch device on a low arm side of the t-phase are always in conduction).

In other words, among the current command values of three phases, two phases other than the phase whose absolute value is the largest may be extracted to be employed as the command values of the carrier C1. In addition, the command values of the two phases are the current conduction ratios per se, and these may be supplied to the first correcting unit 22 and the second correcting unit 23.

For the processing as described above, for example, the middle phase detecting unit 14 is replaced with a processing unit which performs a function of detecting the two phases.

The current conduction ratio in the slope area is obtained from Equation (13), and thus an absolute value of a slope of a trapezoidal wave is represented as $((m+M)+\sqrt{3}\cdot(M-m)\cdot\tan(\varnothing-\pi/6))/2$ or $((m+M)-\sqrt{3}\cdot(M-m)\cdot\tan(\varnothing-\pi/6))/2$ where m and M represent the minimum value and the maximum value of the carrier C1, respectively.

In order to obtain the trapezoidal wave as described above, for example, the trapezoidal-wave-shape voltage command signal generating unit 11 is replaced with the processing unit which generates a current command The current command is generated based on the power supply synchronization signal Vr.

It should be noted that a voltage command value Ir* of the r-phase needs to be shifted by π/6 from the power supply synchronization signal Vr. This is because the current conduction ratio is determined as represented by Equation (9), and thus a starting point of the slope area is shifted by 30° from a starting point of the r-phase. The processing for shifting a phase in this manner may be performed by the above-mentioned processing unit which generates the voltage command.

Although conversion shown in Equation (7) is required in the case where the current-source converter 1 undergoes commutation by detecting a middle phase of the voltage command, in a case where commutation is performed by detecting two phases of the voltage commands, conversion of Equation (7) is not required. Therefore, in the latter case, as to the comparison result between the carrier C1 and the current command, it is only required to perform logical sum operation as in the control of the inverter 2.

Application to Matrix Converter

The above-mentioned direct power converter may be virtualized to perform switching of a matrix converter based on its switching mode.

Figure 14:
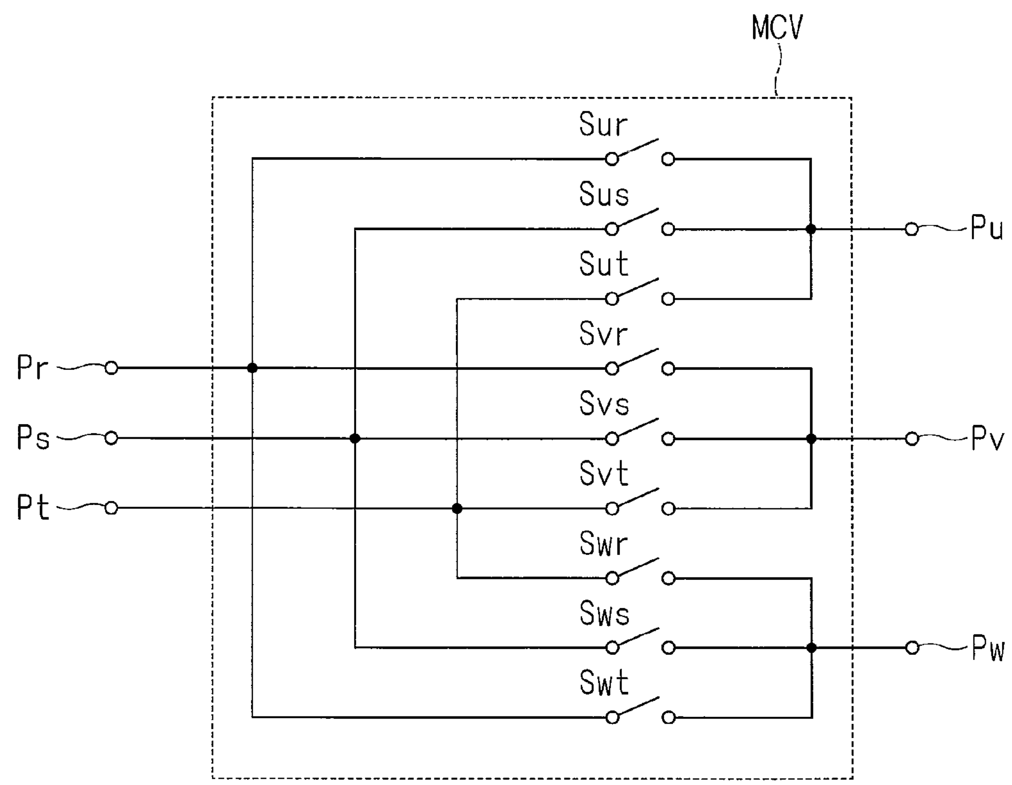
FIG. 14 is a configuration diagram showing a configuration of a matrix converter as an example.

FIG. 14 is a configuration diagram showing, as an example, a configuration of a matrix converter. The matrix converter includes input terminals Pr, Ps and Pt, a direct converting unit MCV, and output terminals Pu, Pv and Pw. At least any of amplitude and cycle of a three-phase AC input voltage input from the input terminals Pr, Ps and Pt is converted, which is output to the output terminals Pu, Pv and Pw as three-phase AC output voltage.

The direct converting unit MCV includes switch devices Sur, Sus, Sut, Svr, Svs, Svt, Swr, Sws and Swt. Three switch devices Sur, Sus and Sut are connected between each of the input terminals Pr, Ps and Pt and the output terminal Pu. Three switch devices Svr, Svs and Svt are connected between each of the input terminals Pr, Ps and Pt and the output terminal Pv. Three switch devices Swr, Sws and Swt are connected between each of the input terminals Pr, Ps and Pt and the output terminal Pw.

FIG. 15 is a block diagram showing a control circuit 10 which generates switch commands for controlling those switch devices. The control circuit 10 has a configuration obtained by adding a gate logic synthesis unit 33 to the control circuit 3.

As to the control of the direct converting unit MCV, the converter 1 and the inverter 2 shown in FIG. 1 are virtualized. As in the embodiments described above, the switch commands Srp*, Ssp*, Stp*, Sm*, Ssn* and Stn* are obtained from the current-source gate logic converting unit 12, and the switch commands Sup, Svp, Swp, Sun, Svn and Swn are obtained from the logical sum operation unit 25.

The gate logic synthesis unit 33 performs matrix transform of the switch commands Srp*, Ssp*, Stp*, Sm*, Ssn*, Stn*, Sup, Svp, Swp, Sun, Svn and Swn from the following equation, and outputs as switch signals of the direct converting unit MCV. Switch signals S11, S12, S13, S21, S22, S23, S31, S32 and S33 are switch signals of the switch devices Sur, Sus, Sut, Svr, Svs, Svt, Swr, Sws and Swt, respectively.

[Equation 22]

$$\begin{bmatrix} S13 & S23 & S33 \\ S12 & S22 & S32 \\ S11 & S21 & S31 \end{bmatrix} = \begin{bmatrix} Sup^{} & Sun^{} \\ Svp^{} & Svn^{} \\ Swp^{} & Swn^{} \end{bmatrix} \begin{bmatrix} Srp^{*} & Ssp^{*} & Stp^{*} \\ Srn^{*} & Ssn^{*} & Stn^{*} \end{bmatrix} \tag{22}$$

Accordingly, the converter 1 and the inverter 2, which are virtual ones, are operated based the embodiment described above. Therefore, by switching of the direct converting unit MCV, it is possible to suppress a distortion of a current at the input terminals Pr, Ps and Pt which results from the zero voltage generated even in this power converting apparatus at three output terminals Pu, Pv and Pw or the dead time.

While the invention has been shown and described in detail, the foregoing description is in all aspects illustrative and not restrictive. It is therefore understood that numerous modifications and variations can be devised without departing from the scope of the invention.

The invention claimed is:

1. A power converting apparatus, comprising:

three input terminals respectively receiving a phase voltage of three-phase AC;

three output terminals;

first and second DC power supply lines;

a converter including a first switch device group including three switch devices connected between each of said input terminals and said first DC power supply line and three switch devices connected between each of said input terminals and said second DC power supply line;

a voltage-source inverter including a second switch device group including three switch devices connected between each of said output terminals and said first DC power supply line and three switch devices connected between each of said output terminals and said second DC power supply line, and employing a dead time in switching of said second switch device group;

a carrier generating unit generating a carrier showing a triangular wave in which an absolute value of a slope is constant with respect to time;

converter gate signal generating units performing commutation of said converter at a timing at which said carrier takes a first reference value for internally dividing an interval from a minimum value to a maximum value of said carrier at a ratio between a first value and a second value; and inverter gate signal generating units, where a first command value is a value smaller by a predetermined value than a second reference value for internally dividing an interval from said first reference value to said maximum value at a ratio between a third value and a fourth value and a second command value is a value larger by said predetermined value than a third reference value for internally dividing an interval from said minimum value to said first reference value at the ratio between said fourth value and said third value, allowing to employ a zero voltage vector as a switching mode of said inverter in a period in which said carrier takes said second command value to said first command value, wherein:

an absolute value of said predetermined value is a value obtained by multiplying a difference between said maximum value and said minimum value of said carrier by a length of said dead time to be divided by a cycle of said carrier; and said predetermined value takes a positive value in a case where a load current flowing to the output terminal being kept in conduction with said first DC power supply line in a period sandwiched between periods employing said zero voltage vector flows out of said inverter, and said predetermined value takes a negative value in a case where said load current flows into said inverter.

2. A power converting apparatus, comprising:

three input terminals respectively receiving a phase voltage of three-phase AC;

three output terminals;

first and second DC power supply lines;

a converter including a first switch device group including three switch devices connected between each of said input terminals and said first DC power supply line and three switch devices connected between each of said input terminals and said second DC power supply line;

an inverter including a second switch device group including three switch devices connected between each of said output terminals and said first DC power supply line and three switch devices connected between each of said output terminals and said second DC power supply line, and employing a dead time in switching of said second switch device group;

a carrier generating unit generating a carrier showing a sawtooth wave having a linear slope with respect to time;

converter gate signal generating units performing commutation of said converter at a timing at which said carrier takes a first reference value for internally dividing an interval from a minimum value to a maximum value in a period when said carrier slopes at a ratio between a first value and a second value and a timing at which said carrier takes transition between said minimum value and said maximum value; and inverter gate signal generating units allowing said inverter to perform switching based on a second reference value and a third reference value for internally dividing an interval from said first reference value to said maximum value at a ratio among a third value, a fourth value and a fifth value in this order, and a fourth reference value and a fifth reference value for internally dividing an interval from said first reference value to said minimum value at a ratio among said third value, said fourth value and said fifth value in this order, wherein:

said inverter gate signal generating units, where a first command value is a value smaller than said third reference value by a predetermined value, a second command value is a value larger than said second reference value by said predetermined value, a third command value is a value smaller than said fourth reference value by a predetermined value, and a fourth command value is a value larger than said fifth reference value by said predetermined value, allow to employ a first zero voltage vector as a switching mode of said inverter in a period in which said carrier takes said second command value to said third command value, and employ a second zero voltage vector as the switching mode of said inverter in a period in which said carrier takes no less than said first command value or no more than said fourth command value;

an absolute value of said predetermined value is a value obtained by multiplying a difference between said maximum value and said minimum value of said carrier by a length of said dead time to be divided by double a cycle of said carrier; and said predetermined value takes a positive value in a case where a current flowing to the output terminal being kept in conduction with said first DC power supply line in a period sandwiched between periods employing said first zero voltage vector and said second zero voltage vector of flows out of said inverter, and said predetermined value takes a negative value in a case where said load current flows into said inverter.

3. The power converting apparatus according to claim 1, wherein:

commutation of said converter is defined by a comparison between said carrier and a trapezoidal wave having 360-degree cycle and having a pair of flat sections with a 120-degree deviation from each other and having a pair of slope areas linking the pair of flat sections; and the minimum value and the maximum value of said carrier are represented by m and M, respectively:

in an area increasing along with an increase in phase angle of said slope area of said trapezoidal wave, said trapezoidal wave takes $((m+M)+\sqrt{3}\cdot(M-m)\cdot\tan(ø-\pi/6))/2$ where a phase angle ø indicating being within said slope area is 0 to π/3 radians; and in an area decreasing along with an increase in phase angle of said slope area of said trapezoidal wave, said trapezoidal wave takes $((m+M)-\sqrt{3}\cdot(M-m)\cdot\tan(ø-\pi/6))/2$ where a phase angle ø indicating being within said slope area is 0 to π/3 radians.

4. The power converting apparatus according to claim 2, wherein:

commutation of said converter is defined by a comparison between said carrier and a trapezoidal wave having 360-degree cycle and having a pair of flat sections with a 120-degree deviation from each other and having a pair of slope areas linking the pair of flat sections; and the minimum value and the maximum value of said carrier are represented by m and M, respectively:

in an area increasing along with an increase in phase angle of said slope area of said trapezoidal wave, said trapezoidal wave takes $((m+M)+\sqrt{3}\cdot(M-m)\cdot\tan(ø-\pi/6))/2$ where a phase angle ø indicating being within said slope area is 0 to π/3 radians; and in an area decreasing along with an increase in phase angle of said slope area of said trapezoidal wave, said trapezoidal wave takes $((m+M)-\sqrt{3}\cdot(M-m)\cdot\tan(ø-\pi/6))/2$ where a phase angle ø indicating being within said slope area is 0 to π/3 radians.

* * * * *